US012259163B2

(12) United States Patent
Butler et al.

(10) Patent No.: US 12,259,163 B2
(45) Date of Patent: Mar. 25, 2025

(54) CLIMATE-CONTROL SYSTEM WITH THERMAL STORAGE

(71) Applicant: Copeland LP, Sidney, OH (US)

(72) Inventors: Brian R. Butler, Sidney, OH (US); Andrew M. Welch, Franklin, OH (US)

(73) Assignee: Copeland LP, Sidney, OH (US)

( * ) Notice: Subject to any disclaimer, the term of this patent is extended or adjusted under 35 U.S.C. 154(b) by 304 days.

(21) Appl. No.: 17/830,026

(22) Filed: Jun. 1, 2022

(65) Prior Publication Data

US 2023/0392835 A1 Dec. 7, 2023

(51) Int. Cl.
*F25B 25/00* (2006.01)
*F25B 13/00* (2006.01)
*F25B 31/02* (2006.01)

(52) U.S. Cl.
CPC .............. *F25B 25/00* (2013.01); *F25B 13/00* (2013.01); *F25B 31/02* (2013.01); *F25B 2313/021* (2013.01); *F25B 2313/02743* (2013.01)

(58) Field of Classification Search
CPC ................ F25B 13/00; F25B 2313/021; F25B 2313/02731; F25B 2313/02743; F25B 2400/24; F25B 25/00; F25B 31/02; F25B 49/02
See application file for complete search history.

(56) References Cited

U.S. PATENT DOCUMENTS

| 3,303,988 A | 2/1967 | Weatherhead |
| 3,777,508 A | 12/1973 | Imabayashi et al. |
| 4,058,988 A | 11/1977 | Shaw |
| 4,197,719 A | 4/1980 | Shaw |

(Continued)

FOREIGN PATENT DOCUMENTS

| AU | 2002301023 B2 | 6/2005 |
| CN | 1137614 A | 12/1996 |

(Continued)

OTHER PUBLICATIONS

Notice of Allowance regarding U.S. Appl. No. 15/646,654, dated Jul. 11, 2018.

(Continued)

*Primary Examiner* — Henry T Crenshaw
(74) *Attorney, Agent, or Firm* — Harness, Dickey & Pierce, P.L.C.

(57) ABSTRACT

A climate-control system may include a compressor, a thermal storage device, an outdoor heat exchanger, an indoor heat exchanger, a first expansion device, and a second expansion device. The compressor may include an intermediate-pressure inlet, an intermediate-pressure outlet, a discharge outlet, a suction-pressure pocket, and a plurality of compression pockets. The thermal storage device may include a conduit and a phase-change material surrounding the conduit. The first expansion valve, the second expansion valve, the outdoor heat exchanger, the indoor heat exchanger, and the thermal storage device may be in fluid communication with the compressor. The climate-control system is operable in a charging mode and a discharging mode, and is operable in a cooling mode and a heating mode. The thermal storage device may be configured to absorb heat from a working fluid or to transfer heat to the working fluid.

20 Claims, 6 Drawing Sheets

(56) References Cited

U.S. PATENT DOCUMENTS

| | | |
|---|---|---|
| 4,216,661 A | 8/1980 | Tojo et al. |
| 4,313,314 A | 2/1982 | Boyanich |
| 4,382,370 A | 5/1983 | Suefuji et al. |
| 4,383,805 A | 5/1983 | Teegarden et al. |
| 4,389,171 A | 6/1983 | Eber et al. |
| 4,466,784 A | 8/1984 | Hiraga |
| 4,469,126 A | 9/1984 | Simpson |
| 4,475,360 A | 10/1984 | Suefuji et al. |
| 4,475,875 A | 10/1984 | Sugimoto et al. |
| 4,480,965 A | 11/1984 | Ishizuka |
| 4,496,296 A | 1/1985 | Arai et al. |
| 4,497,615 A | 2/1985 | Griffith |
| 4,508,491 A | 4/1985 | Schaefer |
| 4,545,742 A | 10/1985 | Schaefer |
| 4,547,138 A | 10/1985 | Mabe et al. |
| 4,552,518 A | 11/1985 | Utter |
| 4,564,339 A | 1/1986 | Nakamura et al. |
| 4,580,949 A | 4/1986 | Maruyama et al. |
| 4,609,329 A | 9/1986 | Pillis et al. |
| 4,650,405 A | 3/1987 | Iwanami et al. |
| 4,696,630 A | 9/1987 | Sakata et al. |
| 4,727,725 A | 3/1988 | Nagata et al. |
| 4,772,188 A | 9/1988 | Kimura et al. |
| 4,774,816 A | 10/1988 | Uchikawa et al. |
| 4,818,195 A | 4/1989 | Murayama et al. |
| 4,824,344 A | 4/1989 | Kimura et al. |
| 4,838,773 A | 6/1989 | Noboru |
| 4,842,499 A | 6/1989 | Nishida et al. |
| 4,846,633 A | 7/1989 | Suzuki et al. |
| 4,877,382 A | 10/1989 | Caillat et al. |
| 4,886,425 A | 12/1989 | Itahana et al. |
| 4,886,433 A | 12/1989 | Maier |
| 4,898,520 A | 2/1990 | Nieter et al. |
| 4,927,339 A | 5/1990 | Riffe et al. |
| 4,936,543 A | 6/1990 | Kamibayasi |
| 4,940,395 A | 7/1990 | Yamamoto et al. |
| 4,954,057 A | 9/1990 | Caillat et al. |
| 4,990,071 A | 2/1991 | Sugimoto |
| 4,997,349 A | 3/1991 | Richardson, Jr. |
| 5,024,589 A | 6/1991 | Jetzer et al. |
| 5,040,952 A | 8/1991 | Inoue et al. |
| 5,040,958 A | 8/1991 | Arata et al. |
| 5,055,010 A | 10/1991 | Logan |
| 5,059,098 A | 10/1991 | Suzuki et al. |
| 5,071,323 A | 12/1991 | Sakashita et al. |
| 5,074,760 A | 12/1991 | Hirooka et al. |
| 5,080,056 A | 1/1992 | Kramer et al. |
| 5,085,565 A | 2/1992 | Barito |
| 5,098,265 A | 3/1992 | Machida et al. |
| 5,145,346 A | 9/1992 | Iio et al. |
| 5,152,682 A | 10/1992 | Morozumi et al. |
| RE34,148 E | 12/1992 | Terauchi et al. |
| 5,169,294 A | 12/1992 | Barito |
| 5,171,141 A | 12/1992 | Morozumi et al. |
| 5,192,195 A | 3/1993 | Iio et al. |
| 5,193,987 A | 3/1993 | Iio et al. |
| 5,199,862 A | 4/1993 | Kondo et al. |
| 5,213,489 A | 5/1993 | Kawahara et al. |
| 5,240,389 A | 8/1993 | Oikawa et al. |
| 5,253,489 A | 10/1993 | Yoshii |
| 5,304,047 A | 4/1994 | Shibamoto |
| 5,318,424 A | 6/1994 | Bush et al. |
| 5,330,463 A | 7/1994 | Hirano |
| 5,336,068 A | 8/1994 | Sekiya et al. |
| 5,340,287 A | 8/1994 | Kawahara et al. |
| 5,355,688 A | 10/1994 | Rafalovich et al. |
| 5,356,271 A | 10/1994 | Miura et al. |
| 5,385,034 A | 1/1995 | Haselden |
| 5,395,224 A | 3/1995 | Caillat et al. |
| 5,411,384 A | 5/1995 | Bass et al. |
| 5,425,626 A | 6/1995 | Tojo et al. |
| 5,427,512 A | 6/1995 | Kohsokabe et al. |
| 5,451,146 A | 9/1995 | Inagaki et al. |
| 5,458,471 A | 10/1995 | Ni |
| 5,458,472 A | 10/1995 | Kobayashi et al. |
| 5,482,637 A | 1/1996 | Rao et al. |
| 5,497,629 A | 3/1996 | Rafalovich et al. |
| 5,511,959 A | 4/1996 | Tojo et al. |
| 5,547,354 A | 8/1996 | Shimizu et al. |
| 5,551,846 A | 9/1996 | Taylor et al. |
| 5,557,897 A | 9/1996 | Kranz et al. |
| 5,562,426 A | 10/1996 | Watanabe et al. |
| 5,577,897 A | 11/1996 | Inagaki et al. |
| 5,591,014 A | 1/1997 | Wallis et al. |
| 5,607,288 A | 3/1997 | Wallis et al. |
| 5,611,674 A | 3/1997 | Bass et al. |
| 5,613,841 A | 3/1997 | Bass et al. |
| 5,622,487 A | 4/1997 | Fukuhara et al. |
| 5,624,247 A | 4/1997 | Nakamura |
| 5,639,225 A | 6/1997 | Matsuda et al. |
| 5,640,854 A | 6/1997 | Fogt et al. |
| 5,649,817 A | 7/1997 | Yamazaki |
| 5,660,539 A | 8/1997 | Matsunaga et al. |
| 5,667,371 A | 9/1997 | Prenger et al. |
| 5,674,058 A | 10/1997 | Matsuda et al. |
| 5,678,626 A | 10/1997 | Gilles |
| 5,678,985 A | 10/1997 | Brooke et al. |
| 5,680,898 A | 10/1997 | Rafalovich et al. |
| 5,707,210 A | 1/1998 | Ramsey et al. |
| 5,722,257 A | 3/1998 | Ishii et al. |
| 5,741,120 A | 4/1998 | Bass et al. |
| 5,755,104 A | 5/1998 | Rafalovich et al. |
| 5,775,893 A | 7/1998 | Takao et al. |
| 5,791,328 A | 8/1998 | Alexander |
| 5,842,843 A | 12/1998 | Haga |
| 5,855,475 A | 1/1999 | Fujio et al. |
| 5,885,063 A | 3/1999 | Makino et al. |
| 5,888,057 A | 3/1999 | Kitano et al. |
| 5,938,417 A | 8/1999 | Takao et al. |
| 5,993,171 A | 11/1999 | Higashiyama |
| 5,993,177 A | 11/1999 | Terauchi et al. |
| 6,010,312 A | 1/2000 | Suitou et al. |
| 6,015,277 A | 1/2000 | Richardson, Jr. |
| 6,030,192 A | 2/2000 | Hill et al. |
| 6,047,557 A | 4/2000 | Pham et al. |
| 6,056,523 A | 5/2000 | Won et al. |
| 6,065,948 A | 5/2000 | Brown |
| 6,068,459 A | 5/2000 | Clarke et al. |
| 6,086,335 A | 7/2000 | Bass et al. |
| 6,093,005 A | 7/2000 | Nakamura |
| 6,095,764 A | 8/2000 | Shibamoto et al. |
| 6,095,765 A | 8/2000 | Khalifa |
| 6,102,671 A | 8/2000 | Yamamoto et al. |
| 6,120,255 A | 9/2000 | Schumann et al. |
| 6,123,517 A | 9/2000 | Brooke et al. |
| 6,123,528 A | 9/2000 | Sun et al. |
| 6,132,179 A | 10/2000 | Higashiyama |
| 6,132,191 A | 10/2000 | Hugenroth et al. |
| 6,139,287 A | 10/2000 | Kuroiwa et al. |
| 6,139,291 A | 10/2000 | Perevozchikov |
| 6,149,401 A | 11/2000 | Iwanami et al. |
| 6,152,714 A | 11/2000 | Mitsuya et al. |
| 6,164,940 A | 12/2000 | Terauchi et al. |
| 6,174,149 B1 | 1/2001 | Bush |
| 6,176,686 B1 | 1/2001 | Wallis et al. |
| 6,179,589 B1 | 1/2001 | Bass et al. |
| 6,182,646 B1 | 2/2001 | Silberstein et al. |
| 6,202,438 B1 | 3/2001 | Barito |
| 6,210,120 B1 | 4/2001 | Hugenroth et al. |
| 6,213,731 B1 | 4/2001 | Doepker et al. |
| 6,217,302 B1 | 4/2001 | Sun et al. |
| 6,224,356 B1 | 5/2001 | Dewar et al. |
| 6,227,830 B1 | 5/2001 | Fields et al. |
| 6,231,316 B1 | 5/2001 | Wakisaka et al. |
| 6,257,840 B1 | 7/2001 | Ignatiev et al. |
| 6,264,444 B1 | 7/2001 | Nakane et al. |
| 6,264,452 B1 | 7/2001 | Sun et al. |
| 6,267,565 B1 | 7/2001 | Seibel et al. |
| 6,273,691 B1 | 8/2001 | Morimoto et al. |
| 6,280,154 B1 | 8/2001 | Clendenin et al. |
| 6,290,477 B1 | 9/2001 | Gigon |
| 6,293,767 B1 | 9/2001 | Bass |
| 6,293,776 B1 | 9/2001 | Hahn et al. |
| 6,309,194 B1 | 10/2001 | Fraser et al. |

(56) References Cited

U.S. PATENT DOCUMENTS

| | | |
|---|---|---|
| 6,322,340 B1 | 11/2001 | Itoh et al. |
| 6,327,871 B1 | 12/2001 | Rafalovich |
| 6,338,912 B1 | 1/2002 | Ban et al. |
| 6,350,111 B1 | 2/2002 | Perevozchikov et al. |
| 6,361,890 B1 | 3/2002 | Ban et al. |
| 6,379,123 B1 | 4/2002 | Makino et al. |
| 6,379,133 B1 | 4/2002 | Hahn et al. |
| 6,389,837 B1 | 5/2002 | Morozumi |
| 6,412,293 B1 | 7/2002 | Pham et al. |
| 6,413,058 B1 | 7/2002 | Williams et al. |
| 6,419,457 B1 | 7/2002 | Seibel et al. |
| 6,422,842 B2 | 7/2002 | Sheridan et al. |
| 6,428,286 B1 | 8/2002 | Shimizu et al. |
| 6,454,551 B2 | 9/2002 | Kuroki et al. |
| 6,457,948 B1 | 10/2002 | Pham |
| 6,457,952 B1 | 10/2002 | Haller et al. |
| 6,464,481 B2 | 10/2002 | Tsubai et al. |
| 6,478,550 B2 | 11/2002 | Matsuba et al. |
| 6,506,036 B2 | 1/2003 | Tsubai et al. |
| 6,514,060 B1 | 2/2003 | Ishiguro et al. |
| 6,537,043 B1 | 3/2003 | Chen |
| 6,544,016 B2 | 4/2003 | Gennami et al. |
| 6,558,143 B2 | 5/2003 | Nakajima et al. |
| 6,589,035 B1 | 7/2003 | Tsubono et al. |
| 6,619,062 B1 | 9/2003 | Shibamoto et al. |
| 6,672,845 B1 | 1/2004 | Kim et al. |
| 6,679,683 B2 | 1/2004 | Seibel et al. |
| 6,705,848 B2 | 3/2004 | Scancarello |
| 6,715,999 B2 | 4/2004 | Ancel et al. |
| 6,746,223 B2 | 6/2004 | Manole |
| 6,749,412 B2 | 6/2004 | Narasipura et al. |
| 6,769,881 B2 | 8/2004 | Lee |
| 6,769,888 B2 | 8/2004 | Tsubono et al. |
| 6,773,242 B1 | 8/2004 | Perevozchikov |
| 6,817,847 B2 | 11/2004 | Agner |
| 6,821,092 B1 | 11/2004 | Gehret et al. |
| 6,863,510 B2 | 3/2005 | Cho |
| 6,881,046 B2 | 4/2005 | Shibamoto et al. |
| 6,884,042 B2 | 4/2005 | Zili et al. |
| 6,887,051 B2 | 5/2005 | Sakuda et al. |
| 6,893,229 B2 | 5/2005 | Choi et al. |
| 6,896,493 B2 | 5/2005 | Chang et al. |
| 6,896,498 B1 | 5/2005 | Patel |
| 6,913,448 B2 | 7/2005 | Liang et al. |
| 6,984,114 B2 | 1/2006 | Zili et al. |
| 7,018,180 B2 | 3/2006 | Koo |
| 7,029,251 B2 | 4/2006 | Chang et al. |
| 7,112,046 B2 | 9/2006 | Kammhoff et al. |
| 7,118,358 B2 | 10/2006 | Tsubono et al. |
| 7,137,796 B2 | 11/2006 | Tsubono et al. |
| 7,160,088 B2 | 1/2007 | Peyton |
| 7,172,395 B2 | 2/2007 | Shibamoto et al. |
| 7,197,890 B2 | 4/2007 | Taras et al. |
| 7,207,787 B2 | 4/2007 | Liang et al. |
| 7,228,710 B2 | 6/2007 | Lifson |
| 7,229,261 B2 | 6/2007 | Morimoto et al. |
| 7,255,542 B2 | 8/2007 | Lifson et al. |
| 7,261,527 B2 | 8/2007 | Alexander et al. |
| 7,311,740 B2 | 12/2007 | Williams et al. |
| 7,344,365 B2 | 3/2008 | Takeuchi et al. |
| RE40,257 E | 4/2008 | Doepker et al. |
| 7,354,259 B2 | 4/2008 | Tsubono et al. |
| 7,364,416 B2 | 4/2008 | Liang et al. |
| 7,371,057 B2 | 5/2008 | Shin et al. |
| 7,371,059 B2 | 5/2008 | Ignatiev et al. |
| RE40,399 E | 6/2008 | Hugenroth et al. |
| RE40,400 E | 6/2008 | Bass et al. |
| 7,393,190 B2 | 7/2008 | Lee et al. |
| 7,404,706 B2 | 7/2008 | Ishikawa et al. |
| 7,421,846 B2 | 9/2008 | Narayanamurthy et al. |
| 7,429,167 B2 | 9/2008 | Bonear et al. |
| RE40,554 E | 10/2008 | Bass et al. |
| 7,484,374 B2 | 2/2009 | Pham et al. |
| 7,510,382 B2 | 3/2009 | Jeong |
| 7,547,202 B2 | 6/2009 | Knapke |
| 7,641,455 B2 | 1/2010 | Fujiwara et al. |
| 7,674,098 B2 | 3/2010 | Lifson |
| 7,695,257 B2 | 4/2010 | Joo et al. |
| 7,717,687 B2 | 5/2010 | Reinhart |
| 7,771,178 B2 | 8/2010 | Perevozchikov et al. |
| 7,802,972 B2 | 9/2010 | Shimizu et al. |
| 7,815,423 B2 | 10/2010 | Guo et al. |
| 7,827,809 B2 | 11/2010 | Pham et al. |
| 7,891,961 B2 | 2/2011 | Shimizu et al. |
| 7,896,629 B2 | 3/2011 | Ignatiev et al. |
| RE42,371 E | 5/2011 | Peyton |
| 7,956,501 B2 | 6/2011 | Jun et al. |
| 7,967,582 B2 | 6/2011 | Akei et al. |
| 7,967,583 B2 | 6/2011 | Stover et al. |
| 7,972,125 B2 | 7/2011 | Stover et al. |
| 7,976,289 B2 | 7/2011 | Masao |
| 7,976,295 B2 | 7/2011 | Stover et al. |
| 7,988,433 B2 | 8/2011 | Akei et al. |
| 7,988,434 B2 | 8/2011 | Stover et al. |
| 8,020,402 B2 | 9/2011 | Pham et al. |
| 8,025,492 B2 | 9/2011 | Seibel et al. |
| 8,079,229 B2 | 12/2011 | Lifson et al. |
| 8,162,622 B2 | 4/2012 | Shoulders |
| 8,181,470 B2 | 5/2012 | Narayanamurthy et al. |
| 8,303,278 B2 | 11/2012 | Roof et al. |
| 8,303,279 B2 | 11/2012 | Hahn |
| 8,308,448 B2 | 11/2012 | Fields et al. |
| 8,313,318 B2 | 11/2012 | Stover et al. |
| 8,328,531 B2 | 12/2012 | Milliff et al. |
| 8,328,543 B2 | 12/2012 | Wilson |
| 8,393,882 B2 | 3/2013 | Ignatiev et al. |
| 8,424,326 B2 | 4/2013 | Mitra et al. |
| 8,505,331 B2 | 8/2013 | Pham et al. |
| 8,506,271 B2 | 8/2013 | Seibel et al. |
| 8,517,703 B2 | 8/2013 | Doepker |
| 8,585,382 B2 | 11/2013 | Akei et al. |
| 8,616,014 B2 | 12/2013 | Stover et al. |
| 8,672,646 B2 | 3/2014 | Ishizono et al. |
| 8,707,723 B2 | 4/2014 | Narayanamurthy |
| 8,757,988 B2 | 6/2014 | Fukudome et al. |
| 8,790,098 B2 | 7/2014 | Stover et al. |
| 8,840,384 B2 | 9/2014 | Patel et al. |
| 8,857,200 B2 | 10/2014 | Stover et al. |
| 8,932,036 B2 | 1/2015 | Monnier et al. |
| 9,068,765 B2 | 6/2015 | Huff |
| 9,080,446 B2 | 7/2015 | Heusler et al. |
| 9,127,677 B2 | 9/2015 | Doepker |
| 9,145,891 B2 | 9/2015 | Kim et al. |
| 9,169,839 B2 | 10/2015 | Ishizono et al. |
| 9,194,395 B2 | 11/2015 | Ginies et al. |
| 9,217,433 B2 | 12/2015 | Park et al. |
| 9,228,587 B2 | 1/2016 | Lee et al. |
| 9,249,802 B2 | 2/2016 | Doepker et al. |
| 9,297,383 B2 | 3/2016 | Jin et al. |
| 9,303,642 B2 | 4/2016 | Akei et al. |
| 9,360,011 B2 | 6/2016 | Perevozchikov et al. |
| 9,435,340 B2 | 9/2016 | Doepker et al. |
| 9,494,157 B2 | 11/2016 | Doepker |
| 9,541,084 B2 | 1/2017 | Ignatiev et al. |
| 9,556,862 B2 | 1/2017 | Yoshihiro et al. |
| 9,581,265 B2 | 2/2017 | Sherbeck et al. |
| 9,605,677 B2 | 3/2017 | Heidecker et al. |
| 9,612,042 B2 | 4/2017 | Sjoholm et al. |
| 9,624,928 B2 | 4/2017 | Yamazaki et al. |
| 9,638,191 B2 | 5/2017 | Stover |
| 9,651,043 B2 | 5/2017 | Stover et al. |
| 9,777,730 B2 | 10/2017 | Doepker et al. |
| 9,777,863 B2 | 10/2017 | Higashidozono et al. |
| 9,790,940 B2 | 10/2017 | Doepker et al. |
| 9,797,400 B2 | 10/2017 | Yun et al. |
| 9,850,903 B2 | 12/2017 | Perevozchikov |
| 9,869,315 B2 | 1/2018 | Jang et al. |
| 9,879,674 B2 | 1/2018 | Akei et al. |
| 9,885,347 B2 | 2/2018 | Lachey et al. |
| 9,920,759 B2 | 3/2018 | Sung et al. |
| 9,926,932 B2 | 3/2018 | Perevozchikov et al. |
| 9,989,057 B2 | 6/2018 | Lochner et al. |
| 10,066,622 B2 | 9/2018 | Pax et al. |
| 10,087,936 B2 | 10/2018 | Pax et al. |

(56) References Cited

U.S. PATENT DOCUMENTS

| | | |
|---|---|---|
| 10,088,202 B2 | 10/2018 | Huff et al. |
| 10,094,380 B2 | 10/2018 | Doepker et al. |
| 10,180,257 B2 | 1/2019 | Cur et al. |
| 10,197,306 B2 | 2/2019 | Li et al. |
| 10,323,639 B2 | 6/2019 | Doepker et al. |
| 10,428,818 B2 | 10/2019 | Jin et al. |
| 10,563,891 B2 | 2/2020 | Smerud et al. |
| 10,724,523 B2 | 7/2020 | Wu et al. |
| 10,815,999 B2 | 10/2020 | Jeong |
| 10,830,503 B2 | 11/2020 | Kopko |
| 10,907,633 B2 | 2/2021 | Doepker et al. |
| 10,954,940 B2 | 3/2021 | Akei et al. |
| 10,974,317 B2 | 4/2021 | Ruxanda et al. |
| 11,209,000 B2 | 12/2021 | Moore et al. |
| 11,231,034 B2 | 1/2022 | Funakoshi et al. |
| 11,300,329 B2 | 4/2022 | Yan et al. |
| 11,378,290 B2 | 7/2022 | Locke et al. |
| 11,493,040 B2 | 11/2022 | Zou et al. |
| 2001/0010800 A1 | 8/2001 | Kohsokabe et al. |
| 2002/0039540 A1 | 4/2002 | Kuroki et al. |
| 2002/0057975 A1 | 5/2002 | Nakajima et al. |
| 2002/0114720 A1 | 8/2002 | Itoh et al. |
| 2003/0044296 A1 | 3/2003 | Chen |
| 2003/0044297 A1 | 3/2003 | Gennami et al. |
| 2003/0186060 A1 | 10/2003 | Rao |
| 2003/0228235 A1 | 12/2003 | Sowa et al. |
| 2004/0126259 A1 | 7/2004 | Choi et al. |
| 2004/0136854 A1 | 7/2004 | Kimura et al. |
| 2004/0146419 A1 | 7/2004 | Kawaguchi et al. |
| 2004/0170509 A1 | 9/2004 | Wehrenberg et al. |
| 2004/0184932 A1 | 9/2004 | Lifson |
| 2004/0197204 A1 | 10/2004 | Yamanouchi et al. |
| 2005/0019177 A1 | 1/2005 | Shin et al. |
| 2005/0019178 A1 | 1/2005 | Shin et al. |
| 2005/0053507 A1 | 3/2005 | Takeuchi et al. |
| 2005/0069444 A1 | 3/2005 | Peyton |
| 2005/0120733 A1 | 6/2005 | Healy et al. |
| 2005/0140232 A1 | 6/2005 | Lee et al. |
| 2005/0201883 A1 | 9/2005 | Clendenin et al. |
| 2005/0214148 A1 | 9/2005 | Ogawa et al. |
| 2006/0099098 A1 | 5/2006 | Lee et al. |
| 2006/0138879 A1 | 6/2006 | Kusase et al. |
| 2006/0198748 A1 | 9/2006 | Grassbaugh et al. |
| 2006/0228243 A1 | 10/2006 | Sun et al. |
| 2006/0233657 A1 | 10/2006 | Bonear et al. |
| 2007/0003666 A1 | 1/2007 | Gutknecht et al. |
| 2007/0036661 A1 | 2/2007 | Stover |
| 2007/0110604 A1 | 5/2007 | Peyton |
| 2007/0130973 A1 | 6/2007 | Lifson et al. |
| 2007/0148026 A1 | 6/2007 | Higashi |
| 2007/0194261 A1 | 8/2007 | Kato et al. |
| 2008/0034772 A1 | 2/2008 | Chumley et al. |
| 2008/0115357 A1 | 5/2008 | Li et al. |
| 2008/0138227 A1 | 6/2008 | Knapke |
| 2008/0159892 A1 | 7/2008 | Huang et al. |
| 2008/0159893 A1 | 7/2008 | Caillat |
| 2008/0196445 A1 | 8/2008 | Lifson et al. |
| 2008/0197206 A1* | 8/2008 | Murakami ............ F25B 45/00 237/2 B |
| 2008/0223057 A1 | 9/2008 | Lifson et al. |
| 2008/0226483 A1 | 9/2008 | Iwanami et al. |
| 2008/0286118 A1 | 11/2008 | Gu et al. |
| 2008/0305270 A1 | 12/2008 | Uhlianuk et al. |
| 2009/0013701 A1 | 1/2009 | Lifson et al. |
| 2009/0035167 A1 | 2/2009 | Sun |
| 2009/0068048 A1 | 3/2009 | Stover et al. |
| 2009/0071183 A1 | 3/2009 | Stover et al. |
| 2009/0185935 A1 | 7/2009 | Seibel et al. |
| 2009/0191080 A1 | 7/2009 | Ignatiev et al. |
| 2009/0205345 A1 | 8/2009 | Narayanamurthy et al. |
| 2009/0293507 A1 | 12/2009 | Narayanamurthy et al. |
| 2009/0297377 A1 | 12/2009 | Stover et al. |
| 2009/0297378 A1 | 12/2009 | Stover et al. |
| 2009/0297379 A1 | 12/2009 | Stover et al. |
| 2009/0297380 A1 | 12/2009 | Stover et al. |
| 2010/0111741 A1 | 5/2010 | Chikano et al. |
| 2010/0135836 A1 | 6/2010 | Stover et al. |
| 2010/0158731 A1 | 6/2010 | Akei et al. |
| 2010/0209278 A1 | 8/2010 | Tarao et al. |
| 2010/0212311 A1 | 8/2010 | McQuary et al. |
| 2010/0212352 A1 | 8/2010 | Kim et al. |
| 2010/0254841 A1 | 10/2010 | Akei et al. |
| 2010/0300659 A1 | 12/2010 | Stover et al. |
| 2010/0303659 A1 | 12/2010 | Stover et al. |
| 2011/0052437 A1 | 3/2011 | Iitsuka et al. |
| 2011/0135509 A1 | 6/2011 | Fields et al. |
| 2011/0174014 A1 | 7/2011 | Scarcella et al. |
| 2011/0206548 A1* | 8/2011 | Doepker ............ F04C 18/0253 29/700 |
| 2011/0232320 A1 | 9/2011 | Satou |
| 2011/0243777 A1 | 10/2011 | Ito et al. |
| 2011/0250085 A1 | 10/2011 | Stover et al. |
| 2011/0293456 A1 | 12/2011 | Seibel et al. |
| 2011/0308762 A1 | 12/2011 | Spero et al. |
| 2012/0009076 A1 | 1/2012 | Kim et al. |
| 2012/0067070 A1 | 3/2012 | Albertson |
| 2012/0107163 A1 | 5/2012 | Monnier et al. |
| 2012/0183422 A1 | 7/2012 | Bahmata |
| 2012/0195781 A1 | 8/2012 | Stover et al. |
| 2013/0078128 A1 | 3/2013 | Akei |
| 2013/0089448 A1 | 4/2013 | Ginies et al. |
| 2013/0094987 A1 | 4/2013 | Yamashita et al. |
| 2013/0098071 A1 | 4/2013 | Means |
| 2013/0121857 A1 | 5/2013 | Liang et al. |
| 2013/0177465 A1 | 7/2013 | Clendenin et al. |
| 2013/0195707 A1 | 8/2013 | Kozuma et al. |
| 2013/0302198 A1 | 11/2013 | Ginies et al. |
| 2013/0309118 A1 | 11/2013 | Ginies et al. |
| 2013/0315768 A1 | 11/2013 | Le Coat et al. |
| 2014/0023540 A1 | 1/2014 | Heidecker et al. |
| 2014/0024563 A1 | 1/2014 | Heidecker et al. |
| 2014/0037486 A1 | 2/2014 | Stover et al. |
| 2014/0134030 A1 | 5/2014 | Stover et al. |
| 2014/0134031 A1 | 5/2014 | Doepker et al. |
| 2014/0147294 A1 | 5/2014 | Fargo et al. |
| 2014/0154121 A1 | 6/2014 | Doepker |
| 2014/0154124 A1 | 6/2014 | Doepker et al. |
| 2014/0219846 A1 | 8/2014 | Ignatiev et al. |
| 2015/0037184 A1 | 2/2015 | Rood et al. |
| 2015/0086404 A1 | 3/2015 | Kiem et al. |
| 2015/0192121 A1 | 7/2015 | Sung et al. |
| 2015/0275898 A1 | 10/2015 | Ahire et al. |
| 2015/0300353 A1 | 10/2015 | Utpat et al. |
| 2015/0330386 A1 | 11/2015 | Doepker |
| 2015/0345493 A1 | 12/2015 | Lochner et al. |
| 2015/0354719 A1 | 12/2015 | Van Beek et al. |
| 2016/0025093 A1 | 1/2016 | Doepker |
| 2016/0025094 A1 | 1/2016 | Ignatiev et al. |
| 2016/0032924 A1 | 2/2016 | Stover |
| 2016/0047380 A1 | 2/2016 | Kim et al. |
| 2016/0053755 A1 | 2/2016 | Taguchi |
| 2016/0053759 A1 | 2/2016 | Choi et al. |
| 2016/0076543 A1 | 3/2016 | Akei et al. |
| 2016/0115954 A1 | 4/2016 | Doepker et al. |
| 2016/0138732 A1 | 5/2016 | Lively et al. |
| 2016/0138879 A1 | 5/2016 | Matsukado et al. |
| 2016/0201673 A1 | 7/2016 | Perevozchikov et al. |
| 2016/0208803 A1 | 7/2016 | Uekawa et al. |
| 2016/0238265 A1 | 8/2016 | Sherbeck et al. |
| 2016/0272047 A1 | 9/2016 | Gan |
| 2017/0002817 A1 | 1/2017 | Stover |
| 2017/0002818 A1 | 1/2017 | Stover |
| 2017/0030354 A1 | 2/2017 | Stover |
| 2017/0097108 A1 | 4/2017 | Huff |
| 2017/0152957 A1 | 6/2017 | Roche et al. |
| 2017/0241417 A1 | 8/2017 | Jin et al. |
| 2017/0268510 A1 | 9/2017 | Stover et al. |
| 2017/0306960 A1 | 10/2017 | Pax et al. |
| 2017/0314558 A1 | 11/2017 | Pax et al. |
| 2017/0342978 A1 | 11/2017 | Doepker |
| 2017/0342983 A1 | 11/2017 | Jin et al. |
| 2017/0342984 A1 | 11/2017 | Jin et al. |
| 2018/0023570 A1 | 1/2018 | Huang et al. |
| 2018/0038369 A1 | 2/2018 | Doepker et al. |

(56) References Cited

U.S. PATENT DOCUMENTS

| | | | |
|---|---|---|---|
| 2018/0038370 A1 | 2/2018 | Doepker et al. | |
| 2018/0066656 A1 | 3/2018 | Perevozchikov et al. | |
| 2018/0066657 A1 | 3/2018 | Perevozchikov et al. | |
| 2018/0135625 A1 | 5/2018 | Naganuma et al. | |
| 2018/0149155 A1 | 5/2018 | Akei et al. | |
| 2018/0216618 A1 | 8/2018 | Jeong | |
| 2018/0223823 A1 | 8/2018 | Ignatiev et al. | |
| 2018/0363965 A1 | 12/2018 | Hayamizu et al. | |
| 2019/0040861 A1 | 2/2019 | Doepker et al. | |
| 2019/0041107 A1 | 2/2019 | Piscopo et al. | |
| 2019/0101120 A1 | 4/2019 | Perevozchikov et al. | |
| 2019/0107300 A1 | 4/2019 | Locke et al. | |
| 2019/0162185 A1 | 5/2019 | Mizushima et al. | |
| 2019/0186491 A1 | 6/2019 | Perevozchikov et al. | |
| 2019/0203709 A1 | 7/2019 | Her et al. | |
| 2019/0210425 A1* | 7/2019 | Azzouz | B60H 1/00328 |
| 2019/0277288 A1 | 9/2019 | Flanigan et al. | |
| 2019/0285318 A1 | 9/2019 | Kopko | |
| 2019/0309993 A1 | 10/2019 | Zaynulin et al. | |
| 2019/0353164 A1* | 11/2019 | Berning | F04C 29/126 |
| 2020/0057458 A1 | 2/2020 | Taguchi | |
| 2020/0291943 A1 | 9/2020 | McBean et al. | |
| 2020/0370808 A1 | 11/2020 | Feng et al. | |
| 2021/0018234 A1* | 1/2021 | Lingrey | F25B 41/26 |
| 2021/0222788 A1 | 7/2021 | Willers et al. | |
| 2021/0262470 A1 | 8/2021 | Wei et al. | |
| 2022/0065504 A1 | 3/2022 | Zou | |
| 2022/0235774 A1 | 7/2022 | Cui et al. | |
| 2023/0030270 A1 | 2/2023 | Andersson et al. | |

FOREIGN PATENT DOCUMENTS

| | | |
|---|---|---|
| CN | 1158944 A | 9/1997 |
| CN | 1158945 A | 9/1997 |
| CN | 1177681 A | 4/1998 |
| CN | 1177683 A | 4/1998 |
| CN | 1259625 A | 7/2000 |
| CN | 1286358 A | 3/2001 |
| CN | 1289011 A | 3/2001 |
| CN | 1339087 A | 3/2002 |
| CN | 1349053 A | 5/2002 |
| CN | 1382912 A | 12/2002 |
| CN | 1407233 A | 4/2003 |
| CN | 1407234 A | 4/2003 |
| CN | 1517553 A | 8/2004 |
| CN | 1601106 A | 3/2005 |
| CN | 1680720 A | 10/2005 |
| CN | 1702328 A | 11/2005 |
| CN | 2747381 Y | 12/2005 |
| CN | 1757925 A | 4/2006 |
| CN | 1828022 A | 9/2006 |
| CN | 1854525 A | 11/2006 |
| CN | 1963214 A | 5/2007 |
| CN | 1995756 A | 7/2007 |
| CN | 101358592 A | 2/2009 |
| CN | 101684785 A | 3/2010 |
| CN | 101761479 A | 6/2010 |
| CN | 101806302 A | 8/2010 |
| CN | 101910637 A | 12/2010 |
| CN | 102076963 A | 5/2011 |
| CN | 102089525 A | 6/2011 |
| CN | 102272454 A | 12/2011 |
| CN | 102400915 A | 4/2012 |
| CN | 102422024 A | 4/2012 |
| CN | 102449314 A | 5/2012 |
| CN | 102705234 A | 10/2012 |
| CN | 102762866 A | 10/2012 |
| CN | 202926640 U | 5/2013 |
| CN | 103502644 A | 1/2014 |
| CN | 103671125 A | 3/2014 |
| CN | 203962320 U | 11/2014 |
| CN | 204041454 U | 12/2014 |
| CN | 104838143 A | 8/2015 |
| CN | 105317678 A | 2/2016 |
| CN | 205533207 U | 8/2016 |
| CN | 205823629 U | 12/2016 |
| CN | 205876712 U | 1/2017 |
| CN | 205876713 U | 1/2017 |
| CN | 205895597 U | 1/2017 |
| CN | 106662104 A | 5/2017 |
| CN | 106979153 A | 7/2017 |
| CN | 207513832 U | 6/2018 |
| CN | 207795587 U | 8/2018 |
| CN | 207974880 U | 10/2018 |
| CN | 209621603 U | 11/2019 |
| CN | 209654225 U | 11/2019 |
| CN | 110529628 A | 12/2019 |
| CN | 209781195 U | 12/2019 |
| DE | 3917656 C2 | 11/1995 |
| DE | 102011001394 A1 | 9/2012 |
| EP | 0256445 A2 | 2/1988 |
| EP | 0747598 A2 | 12/1996 |
| EP | 0822335 A2 | 2/1998 |
| EP | 1067289 A2 | 1/2001 |
| EP | 1081384 A2 | 3/2001 |
| EP | 1087142 A2 | 3/2001 |
| EP | 1182353 A1 | 2/2002 |
| EP | 1 241 417 A1 | 9/2002 |
| EP | 1371851 A2 | 12/2003 |
| EP | 1382854 A2 | 1/2004 |
| EP | 2151577 A1 | 2/2010 |
| EP | 1927755 A3 | 11/2013 |
| FR | 2764347 A1 | 12/1998 |
| GB | 747832 A | 4/1956 |
| GB | 2107829 A | 5/1983 |
| JP | S58214689 A | 12/1983 |
| JP | S60259794 A | 12/1985 |
| JP | S62220789 A | 9/1987 |
| JP | S6385277 A | 4/1988 |
| JP | S63205482 A | 8/1988 |
| JP | H01178789 A | 7/1989 |
| JP | H0281982 A | 3/1990 |
| JP | H02153282 A | 6/1990 |
| JP | H03081588 A | 4/1991 |
| JP | H03233101 A | 10/1991 |
| JP | H04121478 A | 4/1992 |
| JP | H04272490 A | 9/1992 |
| JP | H0610601 A | 1/1994 |
| JP | H0726618 B2 | 3/1995 |
| JP | H07293456 A | 11/1995 |
| JP | H08247053 A | 9/1996 |
| JP | H08320079 A | 12/1996 |
| JP | H08334094 A | 12/1996 |
| JP | H09177689 A | 7/1997 |
| JP | H11107950 A | 4/1999 |
| JP | H11166490 A | 6/1999 |
| JP | 2951752 B2 | 9/1999 |
| JP | H11324950 A | 11/1999 |
| JP | 2000104684 A | 4/2000 |
| JP | 2000161263 A | 6/2000 |
| JP | 2000329078 A | 11/2000 |
| JP | 3141949 B2 | 3/2001 |
| JP | 2002202074 A | 7/2002 |
| JP | 2003074481 A | 3/2003 |
| JP | 2003074482 A | 3/2003 |
| JP | 2003106258 A | 4/2003 |
| JP | 2003214365 A | 7/2003 |
| JP | 2003227479 A | 8/2003 |
| JP | 2004239070 A | 8/2004 |
| JP | 2005264827 A | 9/2005 |
| JP | 2006083754 A | 3/2006 |
| JP | 2006183474 A | 7/2006 |
| JP | 2007154761 A | 6/2007 |
| JP | 2007228683 A | 9/2007 |
| JP | 2008248775 A | 10/2008 |
| JP | 2008267707 A | 11/2008 |
| JP | 2013104305 A | 5/2013 |
| JP | 2013167215 A | 8/2013 |
| KR | 870000015 B1 | 1/1987 |
| KR | 10-2001-0009403 A | 2/2001 |
| KR | 20050027402 A | 3/2005 |
| KR | 20050095246 A | 9/2005 |
| KR | 100547323 B1 | 1/2006 |
| KR | 20100017008 A | 2/2010 |

(56) References Cited

FOREIGN PATENT DOCUMENTS

| | | |
|---|---|---|
| KR | 101009266 B1 | 1/2011 |
| KR | 20120008045 A | 1/2012 |
| KR | 101192642 B1 | 10/2012 |
| KR | 20120115581 A | 10/2012 |
| KR | 20130011864 A | 1/2013 |
| KR | 20130094646 A | 8/2013 |
| KR | 20140114212 A | 9/2014 |
| KR | 10-2018-0094219 A | 8/2018 |
| KR | 101917697 B1 | 11/2018 |
| WO | 9515025 A1 | 6/1995 |
| WO | 0073659 A1 | 12/2000 |
| WO | 2007046810 A2 | 4/2007 |
| WO | 2008060525 A1 | 5/2008 |
| WO | 2009017741 A1 | 2/2009 |
| WO | 2009155099 A2 | 12/2009 |
| WO | 2010118140 A2 | 10/2010 |
| WO | 2011106422 A2 | 9/2011 |
| WO | 2012114455 A1 | 8/2012 |
| WO | 2015187816 A1 | 12/2015 |
| WO | 2017071641 A1 | 5/2017 |
| WO | 2019128793 A1 | 7/2019 |
| WO | 2019165254 A1 | 8/2019 |
| WO | 2019222535 A1 | 11/2019 |
| WO | 2020-209979 A2 | 10/2020 |

OTHER PUBLICATIONS

Notice of Allowance regarding U.S. Appl. No. 15/651,471, dated Jul. 11, 2018.
Office Action regarding U.S. Appl. No. 15/784,540, dated Jul. 17, 2018.
Office Action regarding U.S. Appl. No. 15/784,458, dated Jul. 19, 2018.
Restriction Requirement regarding U.S. Appl. No. 15/587,735, dated Jul. 23, 2018.
Office Action regarding Chinese Patent Application No. 201610499158.7, dated Aug. 1, 2018. Translation provided by Unitalen Attorneys at Law.
Interview Summary regarding U.S. Appl. No. 15/186,092, dated Aug. 14, 2018.
Office Action regarding U.S. Appl. No. 15/187,225, dated Aug. 27, 2018.
Office Action regarding Chinese Patent Application No. 201710795228.8, dated Sep. 5, 2018. Translation provided by Unitalen Attorneys at Law.
Office Action regarding Korean Patent Application No. 10-2016-7034539, dated Sep. 6, 2018. Translation provided by Y.S. Chang & Associates.
Office Action regarding Indian Patent Application No. 1307/MUMNP/2015, dated Sep. 12, 2018.
Office Action regarding Chinese Patent Application No. 201580029636.1, dated Oct. 8, 2018. Translation provided by Unitalen Attorneys at Law.
Office Action regarding U.S. Appl. No. 15/587,735, dated Oct. 9, 2018.
Office Action regarding U.S. Patent Application No. 15/186, 151, dated Nov. 1, 2018.
Office Action regarding Korean Patent Application No. 10-2017-7033995, dated Nov. 29, 2018. Translation provided by Ks Koryo International IP Law Firm.
Notice of Allowance regarding U.S. Appl. No. 15/186,092, dated Dec. 20, 2018.
Office Action regarding Indian Patent Application No. 1306/MUMNP/2015, dated Dec. 31, 2018.
Notice of Allowance regarding U.S. Appl. No. 15/187,225, dated Jan. 3, 2019.
Office Action regarding Chinese Patent Application No. 201610499158.7, dated Feb. 1, 2019. Translation provided by Unitalen Attorneys at Law.
Notice of Allowance regarding U.S. Appl. No. 15/784,458, dated Feb. 7, 2019.
Notice of Allowance regarding U.S. Appl. No. 15/784,540, dated Feb. 7, 2019.
Search Report regarding European Patent Application No. 18198310.7, dated Feb. 27, 2019.
Notice of Allowance regarding U.S. Appl. No. 15/186,151, dated Mar. 19, 2019.
Notice of Allowance regarding U.S. Appl. No. 15/186,092, dated Apr. 19, 2019.
Office Action regarding Chinese Patent Application No. 201710795228.8, dated Apr. 29, 2019. Translation provided by Unitalen Attorneys at Law.
Notice of Allowance regarding U.S. Appl. No. 15/187,225, dated May 2, 2019.
Office Action regarding U.S. Appl. No. 15/587,735, dated May 17, 2019.
Office Action regarding Chinese Patent Application No. 201811011292.3, dated Jun. 21, 2019. Translation provided by Unitalen Attorneys at Law.
Office Action regarding European Patent Application No. 11747996.4, dated Jun. 26, 2019.
Notice of Allowance regarding U.S. Appl. No. 15/186,151, dated Jul. 25, 2019.
Office Action regarding Chinese Patent Application No. 201610499158.7, dated Aug. 1, 2019. Translation provided by Unitalen Attorneys at Law.
Office Action regarding Chinese Patent Application No. 201811168307.7, dated Aug. 12, 2019. Translation provided by Unitalen Attorneys at Law.
Restriction Requirement regarding U.S. Appl. No. 15/682,599, dated Aug. 14, 2019.
Notice of Allowance regarding U.S. Appl. No. 15/587,735, dated Aug. 23, 2019.
International Search Report regarding International Application No. PCT/US2019/032718, dated Aug. 23, 2019.
Written Opinion of the International Searching Authority regarding International Application No. PCT/US2019/032718, dated Aug. 23, 2019.
Office Action regarding Chinese Patent Application No. 201780055443.2, dated Sep. 2, 2019. Translation provided by Unitalen Attorneys at Law.
Office Action regarding U.S. Appl. No. 15/692,844, dated Sep. 20, 2019.
Office Action regarding Chinese Patent Application No. 201710795228.8, dated Oct. 28, 2019. Translation provided by Unitalen Attorneys at Law.
Office Action regarding European Patent Application No. 11747996.4, dated Nov. 5, 2019.
Notice of Allowance regarding U.S. Appl. No. 15/186,151, dated Nov. 14, 2019.
Office Action regarding Indian Patent Application No. 2043/MUMNP/2011, dated Nov. 27, 2019.
Office Action regarding Chinese Patent Application No. 201811480347.5, dated Jan. 10, 2020. Translation provided by Unitalen Attorneys at Law.
Office Action regarding Chinese Patent Application No. 201811541653.5, dated Jan. 10, 2020. Translation provided by Unitalen Attorneys at Law.
Office Action regarding European Patent Application No. 11747996.4, dated Jan. 14, 2020.
Office Action regarding U.S. Appl. No. 15/881,016, dated Jan. 23, 2020.
Office Action regarding U.S. Appl. No. 15/682,599, dated Jan. 24, 2020.
Office Action regarding U.S. Appl. No. 15/831,423, dated Jan. 31, 2020.
Notice of Allowance regarding U.S. Appl. No. 15/692,844, dated Feb. 20, 2020.
Office Action regarding European Patent Application No. 13859308.2, dated Mar. 4, 2020.

(56) References Cited

OTHER PUBLICATIONS

Lee, J. K.; Lee, S. J.; Lee, D. S.; Lee, B. C.; and Lee, U. S., "Identification and Reduction of Noise in a Scroll Compressor" (2000). International Compressor Engineering Conference. Paper 1496.

Non-Final Office Action for U.S. Appl. No. 18/835,048 dated Nov. 24, 2023.

Search Report and Written Opinion in corresponding International Patent Application No. PCT/US2023/023852, dated Sep. 20, 2023.

Advisory Action regarding U.S. Appl. No. 14/073,293, dated Apr. 18, 2016.

Office Action regarding Chinese Patent Application No. 201380062657.4, dated May 4, 2016. Translation provided by Unitalen Attorneys at Law.

Office Action regarding Chinese Patent Application No. 201380059963.2, dated May 10, 2016. Translation provided by Unitalen Attorneys at Law.

Office Action regarding U.S. Appl. No. 14/060,102, dated Jun. 14, 2016.

Office Action regarding U.S. Appl. No. 14/846,877, dated Jul. 15, 2016.

Office Action regarding Chinese Patent Application No. 201410461048.2, dated Jul. 26, 2016. Translation provided by Unitalen Attorneys at Law.

Search Report regarding European Patent Application No. 13858194.7, dated Aug. 3, 2016.

Search Report regarding European Patent Application No. 13859308.2, dated Aug. 3, 2016.

Office Action regarding U.S. Appl. No. 14/294,458, dated Aug. 19, 2016.

Office Action regarding Chinese Patent Application No. 201410460792.0, dated Oct. 21, 2016. Translation provided by Unitalen Attorneys at Law.

Search Report regarding European Patent Application No. 11747996.4, dated Nov. 7, 2016.

Office Action regarding Chinese Patent Application No. 201380059666.8, dated Nov. 23, 2016. Translation provided by Unitalen Attorneys at Law.

Office Action regarding U.S. Appl. No. 14/060,102, dated Dec. 28, 2016.

International Search Report regarding International Application No. PCT/CN2016/103763, dated Jan. 25, 2017.

Written Opinion of the International Searching Authority regarding International Application No. PCT/CN2016/103763, dated Jan. 25, 2017.

Office Action regarding U.S. Appl. No. 15/156,400, dated Feb. 23, 2017.

Office Action regarding U.S. Appl. No. 14/294,458, dated Feb. 28, 2017.

Advisory Action regarding U.S. Appl. No. 14/060,102, dated Mar. 3, 2017.

Office Action regarding U.S. Appl. No. 14/663,073, dated Apr. 11, 2017.

Office Action regarding Chinese Patent Application No. 201410460792.0, dated Apr. 24, 2017. Translation provided by Unitalen Attorneys at Law.

Office Action regarding U.S. Appl. No. 14/946,824, dated May 10, 2017.

Advisory Action regarding U.S. Appl. No. 14/294,458, dated Jun. 9, 2017.

Office Action regarding Chinese Patent Application No. 201610703191.7, dated Jun. 13, 2017. Translation provided by Unitalen Attorneys at Law.

Office Action regarding Chinese Patent Application No. 201610516097.0, dated Jun. 27, 2017. Translation provided by Unitalen Attorneys at Law.

Office Action regarding Indian Patent Application No. 2043/MUMNP/2011, dated Jul. 28, 2017.

Restriction Requirement regarding U.S. Appl. No. 14/809,786, dated Aug. 16, 2017.

Office Action regarding U.S. Appl. No. 14/294,458, dated Sep. 21, 2017.

Office Action regarding U.S. Appl. No. 14/757,407, dated Oct. 13, 2017.

Office Action regarding Chinese Patent Application No. 201610158216.X, dated Oct. 30, 2017. Translation provided by Unitalen Attorneys at Law.

Office Action regarding Chinese Patent Application No. 201410460792.0, dated Nov. 1, 2017. Translation provided by Unitalen Attorneys at Law.

Office Action regarding Chinese Patent Application No. 201610512702.7, dated Dec. 20, 2017. Partial translation provided by Unitalen Attorneys at Law.

International Search Report regarding International Application No. PCT/US2017/050525, dated Dec. 28, 2017.

Written Opinion of the International Searching Authority regarding International Application No. PCT/US2017/050525, dated Dec. 28, 2017.

Office Action regarding Chinese Patent Application No. 201610499158.7, dated Jan. 9, 2018. Translation provided by Unitalen Attorneys at Law.

Office Action regarding U.S. Appl. No. 14/809,786, dated Jan. 11, 2018.

Office Action regarding Chinese Patent Application No. 201580029636.1, dated Jan. 17, 2018. Translation provided by Unitalen Attorneys at Law.

Office Action regarding Chinese Patent Application No. 201580041209.5, dated Jan. 17, 2018. Translation provided by Unitalen Attorneys at Law.

Office Action regarding U.S. Appl. No. 15/646,654, dated Feb. 9, 2018.

Office Action regarding U.S. Appl. No. 15/651,471, dated Feb. 23, 2018.

Office Action regarding Indian Patent Application No. 1907/MUMNP/2012, dated Feb. 26, 2018.

Restriction Requirement regarding U.S. Appl. No. 15/186,092, dated Apr. 3, 2018.

Restriction Requirement regarding U.S. Appl. No. 15/784,458, dated Apr. 5, 2018.

Office Action regarding Korean Patent Application No. 10-2016-7034539, dated Apr. 11, 2018. Translation provided by Y.S. Chang & Associates.

Office Action regarding U.S. Appl. No. 15/186,151, dated May 3, 2018.

Office Action regarding Chinese Patent Application No. 201610930347.5, dated May 14, 2018. Translation provided by Unitalen Attorneys at Law.

Restriction Requirement regarding U.S. Appl. No. 15/187,225, dated May 15, 2018.

Notice of Allowance regarding U.S. Appl. No. 14/757,407, dated May 24, 2018.

Office Action regarding Chinese Patent Application No. 201610158216.X, dated Jun. 13, 2018. Translation provided by Unitalen Attorneys at Law.

Office Action regarding European Patent Application No. 13859308.2, dated Jun. 22, 2018.

Office Action regarding U.S. Appl. No. 15/186,092, dated Jun. 29, 2018.

Office Action regarding Chinese Patent Application No. 201811168307.7, dated Mar. 27, 2020. Translation provided by Unitalen Attorneys at Law.

Office Action regarding Korean Patent Application No. 10-2018-0159231, dated Apr. 7, 2020. Translation provided by KS KORYO International IP Law Firm.

Office Action regarding Chinese Patent Application No. 201780055443.2, dated Apr. 14, 2020. Translation provided by Unitalen Attorneys at Law.

Notice of Allowance regarding U.S. Appl. No. 15/682,599, dated Apr. 22, 2020.

Notice of Allowance regarding U.S. Appl. No. 15/831,423, dated May 20, 2020.

Notice of Allowance regarding U.S. Appl. No. 15/692,844, dated Jun. 4, 2020.

(56) References Cited

OTHER PUBLICATIONS

Restriction Requirement regarding U.S. Appl. No. 16/147,920, dated Jun. 25, 2020.
Office Action regarding U.S. Appl. No. 16/154,406, dated Jun. 29, 2020.
International Search Report regarding International Application No. PCT/US2020/022030, dated Jul. 2, 2020.
Written Opinion of the International Searching Authority regarding International Application No. PCT/US2020/022030, dated Jul. 2, 2020.
Restriction Requirement regarding U.S. Appl. No. 16/154,844, dated Jul. 2, 2020.
Office Action regarding Chinese Patent Application No. 201811480347.5, dated Jul. 21, 2020. Translation provided by Unitalen Attorneys at Law.
Office Action regarding U.S. Appl. No. 15/881,016, dated Jul. 21, 2020.
Office Action regarding U.S. Appl. No. 16/177,902, dated Jul. 23, 2020.
Office Action regarding U.S. Appl. No. 16/147,920, dated Sep. 25, 2020.
Notice of Allowance regarding U.S. Appl. No. 16/154,406, dated Oct. 2, 2020.
Office Action regarding U.S. Appl. No. 16/154,844, dated Oct. 5, 2020.
Notice of Allowance regarding U.S. Appl. No. 15/881,016, dated Nov. 17, 2020.
Notice of Allowance regarding U.S. Appl. No. 16/177,902, dated Nov. 27, 2020.
Notice of Allowance regarding U.S. Appl. No. 16/147,920, dated Feb. 2, 2021.
Notice of Allowance regarding U.S. Appl. No. 16/154,844, dated Feb. 10, 2021.
Heatcraft Rpd; How and Why we use Capacity Control; dated Jan. 17, 2016.
Non-Final Office Action regarding U.S. Appl. No. 17/176,080 dated Mar. 30, 2022.
First Chinese Office Action & Search Report regarding Application No. 201980040745.1 dated Jan. 6, 2022. English translation provided by Unitalen Attorneys at Law.
Non-Final Office Action regarding U.S. Appl. No. 17/388,923 dated Jun. 9, 2022.
Notice of Allowance regarding U.S. Appl. No. 17/157,588 dated Jun. 16, 2022.
Final Office Action regarding U.S. Appl. No. 17/176,080 dated Aug. 12, 2022.
Advisory Action regarding U.S. Appl. No. 17/176,080 dated Oct. 17, 2022.
Performance of the Use of Plastics in Oil-Free Scroll Compressors, Shaffer et al., 2012.
Notice of Allowance regarding U.S. Appl. No. 17/176,080 dated Dec. 15, 2022.
Corrected Notice of Allowance regarding U.S. Appl. No. 17/176,080 dated Dec. 21, 2022.
Notice of Allowance regarding U.S. Appl. No. 17/176,080 dated Feb. 8, 2023.
Office Action mailed Jan. 19, 2023, in U.S. Appl. No. 17/196,119.
Office Action mailed Mar. 9, 2023, in U.S. Appl. No. 17/835,048.
Notice of Allowance regarding U.S. Appl. No. 17/196,119 dated Apr. 26, 2023.
Non-Final Office Action regarding U.S. Appl. No. 17/886,047 dated May 17, 2023.
Non-Final Office Action regarding U.S. Appl. No. 17/980,798 dated May 24, 2023.
Office Action regarding Chinese Patent Application No. 2022109807542, dated May 15, 2023. Translation provided by Unitalen Attorneys at Law.
Office Action regarding European Patent Application No. 198040792, dated Jun. 13, 2023.
Notice of Allowance regarding U.S. Appl. No. 17/866,047 dated Aug. 18, 2023.
Notice of Allowance regarding U.S. Appl. No. 17/980,798 dated Sep. 20, 2023.
Final Office Action regarding U.S. Appl. No. 17/835,048 dated Aug. 10, 2023.
International Search Report and Written Opinion in corresponding Application No. PCT/US2023/029860 dated Nov. 21, 2023.
Non-Final Office Action for U.S. Appl. No. 18/115,355 dated Jul. 18, 2023.
International Search Report Regarding Application PCT/US2023/015116-WO-POA Dated Sep. 5, 2023.
International Search Report and Written Opinion in corresponding Application No. PCT/US2022/033029 dated Dec. 6, 2022.
Liegeois, Olivier and Winandy, Eric, "Scroll Compressors for Dedicated Heat Pumps: Development and Performance Comparison" (2008). International Compressor Engineering Conference. Paper 1906.
Itoh, T.; Fujitani, M.; and Takeda, K., "Investigation of Discharge Flow Pulsation in Scroll Crompressors" (1994). International Compressor Engineering Conference. Paper 1056.
Toyama, T.; Nishikawa, Y.; Yoshida, Y.; Hiodoshi, S.; and Shibamoto, Y., "Reduction of Noise and Over-Compression Loss by Scroll Compressor With Modified Discharge Check Valve" (2002). International Compressor Engineering Conference. Paper 1587.
Yanagisawa, M.; Uematsu, T.; Hiodoshi, S.; Saito, M.; and Era, S., "Noise Reduction Technology for Inverter Controlled Scroll Compressors" (2002). International Compressor Engineering Conference. Paper 1578.
Non-Final Office Action regarding U.S. Appl. No. 18/394,474 dated Apr. 11, 2024.
International Search Report and Written Opinion regarding Application No. PCT/US2023/086010 dated Apr. 24, 2024.
Luckevich, Mark, "MEMS microvalves: the new valve world." Valve World, May 2007, pp. 79-83.
Office Action regarding U.S. Appl. No. 11/522,250, dated Aug. 1, 2007.
Search Report regarding European Patent Application No. 07254962.9, dated Mar. 12, 2008.
Office Action regarding Chinese Patent Application No. 200710153687.2, dated Mar. 6, 2009. Translation provided by CCPIT Patent and Trademark Law Office.
Office Action regarding U.S. Appl. No. 12/103,265, dated May 27, 2009.
Office Action regarding U.S. Appl. No. 11/645,288, dated Nov. 30, 2009.
Office Action regarding U.S. Appl. No. 12/103,265, dated Dec. 17, 2009.
Office Action regarding Korean Patent Application No. 10-2007-0093478, dated Feb. 25, 2010. Translation provided by Y.S. Chang & Associates.
Office Action regarding U.S. Appl. No. 12/103,265, dated Jun. 15, 2010.
Office Action regarding Chinese Patent Application No. 200710160038.5, dated Jul. 8, 2010. Translation provided by Unitalen Attorneys At Law.
Office Action regarding Korean Patent Application No. 10-2007-0093478, dated Aug. 31, 2010. Translation provided by Y.S. Chang & Associates.
Advisory Action regarding U.S. Appl. No. 12/103,265, dated Sep. 17, 2010.
International Search Report regarding International Application No. PCT/US2010/030248, dated Nov. 26, 2010.
Written Opinion of the International Searching Authority regarding International Application No. PCT/US2010/030248, dated Nov. 26, 2010.
International Search Report regarding International Application No. PCT/US2011/025921, dated Oct. 7, 2011.
Written Opinion of the International Search Authority regarding International Application No. PCT/US2011/025921, dated Oct. 7, 2011.

(56) References Cited

OTHER PUBLICATIONS

Office Action regarding Chinese Patent Application No. 200710160038.5, dated Jan. 31, 2012. Translation provided by Unitalen Attorneys at Law.
Office Action regarding Chinese Patent Application No. 201010224582.3, dated Apr. 17, 2012. Translation provided by Unitalen Attorneys at Law.
Office Action regarding Indian Patent Application No. 1071/KOL/2007, dated Apr. 27, 2012.
Office Action regarding U.S. Appl. No. 13/036,529, dated Aug. 22, 2012.
Office Action regarding U.S. Appl. No. 13/181,065, dated Nov. 9, 2012.
International Search Report regarding International Application No. PCT/US2013/051678, dated Oct. 21, 2013.
Written Opinion of the International Searching Authority regarding International Application No. PCT/US2013/051678, dated Oct. 21, 2013.
Office Action regarding Chinese Patent Application No. 201080020243.1, dated Nov. 5, 2013. Translation provided by Unitalen Attorneys at Law.
International Search Report regarding International Application No. PCT/US2013/069456, dated Feb. 18, 2014.
Written Opinion of the International Searching Authority regarding International Application No. PCT/US2013/069456, dated Feb. 18, 2014.
International Search Report regarding International Application No. PCT/US2013/069462, dated Feb. 21, 2014.
Written Opinion of the International Searching Authority regarding International Application No. PCT/US2013/069462, dated Feb. 21, 2014.
International Search Report regarding International Application No. PCT/US2013/070992, dated Feb. 25, 2014.
Written Opinion of the International Searching Authority regarding International Application No. PCT/US2013/070992, dated Feb. 25, 2014.
International Search Report regarding International Application No. PCT/US2013/070981, dated Mar. 4, 2014.
Written Opinion of the International Searching Authority regarding International Application No. PCT/US2013/070981, dated Mar. 4, 2014.
Office Action regarding Chinese Patent Application No. 201180010366.1, dated Jun. 4, 2014. Translation provided by Unitalen Attorneys at Law.
Office Action regarding Chinese Patent Application No. 201180010366.1, dated Dec. 31, 2014. Translation provided by Unitalen Attorneys at Law.
Office Action regarding U.S. Appl. No. 14/081,390, dated Mar. 27, 2015.
Search Report regarding European Patent Application No. 10762374.6, dated Jun. 16, 2015.
Office Action regarding U.S. Appl. No. 14/060,240, dated Aug. 12, 2015.
International Search Report regarding International Application No. PCT/US2015/033960, dated Sep. 1, 2015.
Written Opinion of the International Searching Authority regarding International Application No. PCT/US2015/033960, dated Sep. 1, 2015.
Office Action regarding U.S. Appl. No. 14/073,293, dated Sep. 25, 2015.
Restriction Requirement regarding U.S. Appl. No. 14/060,102, dated Oct. 7, 2015.
International Search Report regarding International Application No. PCT/US2015/042479, dated Oct. 23, 2015.
Written Opinion of the International Searching Authority regarding International Application No. PCT/US2015/042479, dated Oct. 23, 2015.
Office Action regarding Chinese Patent Application No. 201410461048.2, dated Nov. 30, 2015. Translation provided by Unitalen Attorneys at Law.
Notice of Allowance regarding U.S. Appl. No. 14/060,240, dated Dec. 1, 2015.
Office Action regarding U.S. Appl. No. 14/073,293, dated Jan. 29, 2016.
Office Action regarding Chinese Patent Application No. 201410460792.0, dated Feb. 25, 2016. Translation provided by Unitalen Attorneys at Law.
Restriction Requirement regarding U.S. Appl. No. 14/060,102, dated Mar. 16, 2016.
Office Action regarding Chinese Patent Application No. 201380059666.8, dated Apr. 5, 2016. Translation provided by Unitalen Attorneys at Law.
Office Action regarding Chinese Patent Application No. 201380062614.6, dated Apr. 5, 2016. Translation provided by Unitalen Attorneys at Law.
Notice of Allowance regarding U.S. Appl. No. 18/541,828 dated Aug. 12, 2024.
Notice of Allowance regarding U.S Appl. No. 18/533,121 dated Aug. 14, 2024.
Final Office Action regarding U.S. Appl. No. 18/394,474 dated Aug. 28, 2024.
Notice of Allowance regarding U.S. Appl. No. 18/381,884 dated Sep. 4, 2024.
Carrier, Optimal Cooling or Optimized Savings?, Mar. 2017.
Khushairi et al., A Study on the Optimization of Control Strategy of a Thermal Energy Storage System for Building Air-Conditioning, 2011.
International Search Report and Written Opinion of the ISA for PCT/US2022/029616, ISA/KR, mailed Aug. 30, 2022.
Non-Final Office Action regarding U.S. Appl. No. 17/324,696 dated Nov. 17, 2022.
Non-Final Office Action regarding U.S. Appl. No. 17/324,696 dated May 22, 2023.
Final Office Action regarding U.S. Appl. No. 17/324,696 dated Nov. 9, 2023.
Chen, Multi-way valve, thermal management system and electric automobile, Dec. 13, 2019, Whole Document (Year: 2019).
Lee, One-piece type multiple unit valve device of water pump for vehicle, English Translation, Oct. 16, 2018, Whole Document (Year: 2018).
Final Office Action regarding U.S. Appl. No. 18/394,474 dated Nov. 21, 2024.

* cited by examiner

CLIMATE-CONTROL SYSTEM WITH THERMAL STORAGE

FIELD

The present disclosure relates to a climate-control system with a thermal storage component.

BACKGROUND

This section provides background information related to the present disclosure and is not necessarily prior art.

A climate-control system such as, for example, a heat-pump system, a refrigeration system, or an air conditioning system, may include a fluid circuit having an outdoor heat exchanger, one or more indoor heat exchangers, one or more expansion devices, and one or more compressors circulating a working fluid (e.g., refrigerant or carbon dioxide) through the fluid circuit. Efficient and reliable operation of the climate-control system is desirable to ensure that the climate-control system is capable of effectively and efficiently providing a cooling and/or heating effect on demand.

Additionally, the availability and cost of power for the heat-pump system may vary throughout the day. The ability to reduce power consumption during inopportune times without reducing heat-pump system performance is desirable.

SUMMARY

This section provides a general summary of the disclosure and is not a comprehensive disclosure of its full scope or all of its features.

An aspect of the present disclosure provides a climate-control system that includes a compressor configured to compress a working fluid, a thermal storage including a conduit in fluid communication with the compressor, an outdoor heat exchanger in fluid communication with the compressor, an indoor heat exchanger in fluid communication with the compressor, a first expansion valve in fluid communication with the outdoor heat exchanger and the indoor heat exchanger, and a second expansion valve in fluid communication with the outdoor heat exchanger and the indoor heat exchanger. The compressor may include a suction inlet, an intermediate-pressure inlet, an intermediate-pressure outlet, a discharge outlet, and a plurality of pockets. The plurality of pockets may include a suction-pressure pocket, a first intermediate-pressure pocket, a second intermediate-pressure pocket, and a discharge-pressure pocket. The thermal storage may contain a phase-change material surrounding the conduit. The intermediate-pressure outlet of the compressor may receive working fluid from the first intermediate-pressure pocket of the compressor. The intermediate-pressure inlet of the compressor may provide working fluid to the second intermediate-pressure pocket of the compressor. Working fluid in the discharge-pressure pocket may be at a higher pressure than working fluid in the first intermediate-pressure pocket, working fluid in the first intermediate-pressure pocket may be at a higher pressure than working fluid in the second intermediate-pressure pocket, and working fluid in the second intermediate-pressure pocket may be at a higher pressure than working fluid in the suction-pressure pocket. When the climate-control system is operating in a charging mode, the climate-control system may be operating in one of a heating mode and a cooling mode. When the climate-control system is operating in the charging mode and the heating mode, the phase-change material may absorb heat from the working fluid as the working fluid flows through the conduit of the thermal storage device. When the climate-control system is operating in the charging mode and the cooling mode, the phase-change material may transfer heat to the working fluid as the working fluid flows through the conduit of the thermal storage device.

In some configurations of the climate-control system of the above paragraph, when the climate-control system is operating in the charging mode and the heating mode, the climate-control system may be configured such that the working fluid flows from the compressor, through the indoor heat exchanger, through the outdoor heat exchanger, and to the compressor.

In some configurations of the climate-control system of either of the above paragraphs, the climate-control system may further include a first reversing valve in fluid communication with the compressor, including first and second inlets and first and second outlets, and a second reversing valve in fluid communication with the compressor, including first and second inlets and first and second outlets. The first reversing valve may be configured to allow the working fluid to flow from the second expansion valve, through the first inlet of the first reversing valve and the first outlet of the first reversing valve, and to the outdoor heat exchanger, and to allow the working fluid to flow from the discharge outlet of the compressor through a second inlet of the first reversing valve and the second outlet of the first reversing valve, and to the indoor heat exchanger. The second reversing valve may be configured to allow the working fluid to flow from the outdoor heat exchanger, through the first inlet of the second reversing valve and the first outlet of the second reversing valve, and to the suction inlet of the compressor, and to allow the working fluid to flow from the indoor heat exchanger, through the second inlet of the second reversing valve and the second outlet of the second reversing valve, and to the first expansion valve.

In some configurations of the climate-control system of any of the above paragraphs, the climate-control system may further include a third reversing valve in fluid communication with the compressor, including first and second inlets and first and second outlets. The third reversing valve may be configured to allow the working fluid to flow from the thermal storage device, through the first inlet of the third reversing valve and the first outlet of the third reversing valve, and to the second expansion valve, and to allow the working fluid to flow from the intermediate outlet of the compressor, through the second inlet of the third reversing valve and the second outlet of the third reversing valve, and to the thermal storage device.

In some configurations of the climate-control system of any of the above paragraphs, when the climate-control system is operating in the charging mode and the cooling mode, the climate-control system may be configured such that the working fluid flows from the compressor, through the outdoor heat exchanger, through the indoor heat exchanger, and to the compressor.

In some configurations of the climate-control system of any of the above paragraphs, the climate-control system may further include a first reversing valve in fluid communication with the compressor, including first and second inlets and first and second outlets, and a second reversing valve in fluid communication with the compressor, including first and second inlets and first and second outlets. The first reversing valve may be configured to allow the working fluid to flow from the second expansion valve, through the first inlet of the first reversing valve and the first outlet of the first reversing valve, and to the indoor heat exchanger and to allow the working fluid to flow from the discharge outlet of the compressor, through the second inlet of the first reversing valve and the second outlet of the first reversing valve, and to the outdoor heat exchanger. The second reversing valve is configured to allow the working fluid to flow from the outdoor heat exchanger, through the first inlet of the second reversing valve and the first outlet of the second reversing valve, and to the first expansion valve, and to allow the working fluid to flow from the indoor heat exchanger, through the second inlet of the second reversing valve and the second outlet of the second reversing valve, and to the suction inlet of the compressor.

In some configurations of the climate-control system of any of the above paragraphs, the climate-control system may further include a third reversing valve in fluid communication with the compressor, including first and second inlets and first and second outlets. The third reversing valve may be configured to allow the working fluid to flow from the thermal storage device, through the first inlet of the third reversing valve and the first outlet of the third reversing valve, and to the intermediate inlet of the compressor, and to allow the working fluid to flow from the first expansion valve, through the second inlet of the third reversing valve and the second outlet of the third reversing valve, and to the thermal storage device.

In some configurations of the climate-control system of any of the above paragraphs, the climate-control system may be configured such that the working fluid flows in a direction through the conduit of the thermal storage device when the climate-control system is operating in the heating mode and when the climate-control system is operating in the cooling mode.

In some configurations of the climate-control system of any of the above paragraphs, the phase-change material of the thermal storage device may be paraffin.

In some configurations of the climate-control system of any of the above paragraphs, the phase-change material of the thermal storage device may be salt hydrate.

Another aspect of the present disclosure provides a climate-control system that includes a compressor configured to compress a working fluid, a thermal storage including a conduit in fluid communication with the compressor, an outdoor heat exchanger in fluid communication with the compressor, an indoor heat exchanger in fluid communication with the compressor, a first expansion valve in fluid communication with the outdoor heat exchanger and the indoor heat exchanger, and a second expansion valve in fluid communication with the outdoor heat exchanger and the indoor heat exchanger. The compressor may include a suction inlet, an intermediate-pressure inlet, an intermediate-pressure outlet, a discharge outlet, and a plurality of pockets. The plurality of pockets may include a suction-pressure pocket, a first intermediate-pressure pocket, a second intermediate-pressure pocket, and a discharge-pressure pocket. The thermal storage may contain a phase-change material surrounding the conduit. The intermediate-pressure outlet of the compressor may receive working fluid from the first intermediate-pressure pocket of the compressor. The intermediate-pressure inlet of the compressor may provide working fluid to the second intermediate-pressure pocket of the compressor. Working fluid in the discharge-pressure pocket may be at a higher pressure than working fluid in the first intermediate-pressure pocket, working fluid in the first intermediate-pressure pocket may be at a higher pressure than working fluid in the second intermediate-pressure pocket, and working fluid in the second intermediate-pressure pocket may be at a higher pressure than working fluid in the suction-pressure pocket. When the climate-control system is operating in a discharging mode, the climate-control system may be operating in one of a heating mode and a cooling mode. When the climate-control system is operating in the discharging mode and the heating mode, the working fluid may absorb heat from the phase-change material as the working fluid flows through the conduit of the thermal storage device. When the climate-control system is operating in the discharging mode and the cooling mode, the working fluid may transfer heat to the phase-change material as the working fluid flows through the conduit of the thermal storage device.

In some configurations of the climate-control system of the above paragraph, when the climate-control system is operating in the discharging mode and the cooling mode, the climate-control system may be configured such that the working fluid flows from the compressor, through the outdoor heat exchanger, through the indoor heat exchanger, and to the compressor.

In some configurations of the climate-control system of either of the above paragraphs, the climate-control system may further include a first reversing valve in fluid communication with the compressor, including first and second inlets and first and second outlets, and a second reversing valve in fluid communication with the compressor, including first and second inlets and first and second outlets. The first reversing valve may be configured to allow the working fluid to flow from the discharge outlet of the compressor, through the first inlet of the first reversing valve and the first outlet of the first reversing valve, and to the outdoor heat exchanger, and to allow the working fluid to flow from the second expansion valve, through the second inlet of the first reversing valve and the second outlet of the first reversing valve, and to the indoor heat exchanger. The second reversing valve may be configured to allow the working fluid to flow from the outdoor heat exchanger, through the first inlet of the second reversing valve and the first outlet of the second reversing valve, and to first expansion valve, and to allow the working fluid to flow from the indoor heat exchanger, through the second inlet of the second reversing valve and the second outlet of the second reversing valve, and to the suction inlet of the compressor.

In some configurations of the climate-control system of any of the above paragraphs, the climate-control system may further include a third reversing valve in fluid communication with the compressor, including first and second inlets and first and second outlets. The third reversing valve may be configured to allow the working fluid to flow from the thermal storage device, through the first inlet of the third reversing valve and the first outlet of the third reversing valve, and to the second expansion valve, and to allow the working fluid to flow from the intermediate outlet of the compressor, through the second inlet of the third reversing valve and the second outlet of the third reversing valve, and to the thermal storage device In some configurations of the climate-control system of any of the above paragraphs, when the climate-control system is operating in the discharging mode and the heating mode, the climate-control system may be configured such that the working fluid flows from the compressor, through the indoor heat exchanger, through the outdoor heat exchanger, and to the compressor.

In some configurations of the climate-control system of any of the above paragraphs, the climate-control system may further include a first reversing valve in fluid communication with the compressor, including first and second inlets and first and second outlets, and a second reversing valve in fluid communication with the compressor, including first and second inlets and first and second outlets. The first reversing valve may be configured to allow the working fluid to flow from the second expansion valve, through the first inlet of the first reversing valve and the first outlet of the first reversing valve, and to the outdoor heat exchanger and to allow the working fluid to flow from the discharge outlet of the compressor, through the second inlet of the first reversing valve and the second outlet of the first reversing valve, and to the indoor heat exchanger. The second reversing valve may be configured to allow the working fluid to flow from the indoor heat exchanger, through the first inlet of the second reversing valve and the first outlet of the second reversing valve, and to the outdoor heat exchanger and to allow the working fluid to flow from the outdoor heat exchanger, through the second inlet of the second reversing valve and the second outlet of the second reversing valve, and to the suction inlet of the compressor.

In some configurations of the climate-control system of any of the above paragraphs, the climate-control system may further include a third reversing valve in fluid communication with the compressor, including first and second inlets and first and second outlets. The third reversing valve may be configured to allow the working fluid to flow from the first expansion valve, through the first inlet of the third reversing valve and the first outlet of the third reversing valve, and to thermal storage device and to allow the working fluid to flow from the thermal storage device, through the second inlet of the third reversing valve and the second outlet of the third reversing valve, and to the intermediate inlet of the compressor.

In some configurations of the climate-control system of any of the above paragraphs, the climate-control system may be configured such that the working fluid flows in a direction through the conduit of the thermal storage device when the climate-control system is operating in the heating mode and when the climate-control system is operating in the cooling mode.

In some configurations, the climate-control system of any of the above paragraphs, the phase-change material of the thermal storage device may be paraffin.

In some configurations of the climate-control system of any of the above paragraphs, the phase-change material of the thermal storage device may be salt hydrate.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

Corresponding reference numerals indicate corresponding parts throughout the several views of the drawings.

DETAILED DESCRIPTION

Figure 1:
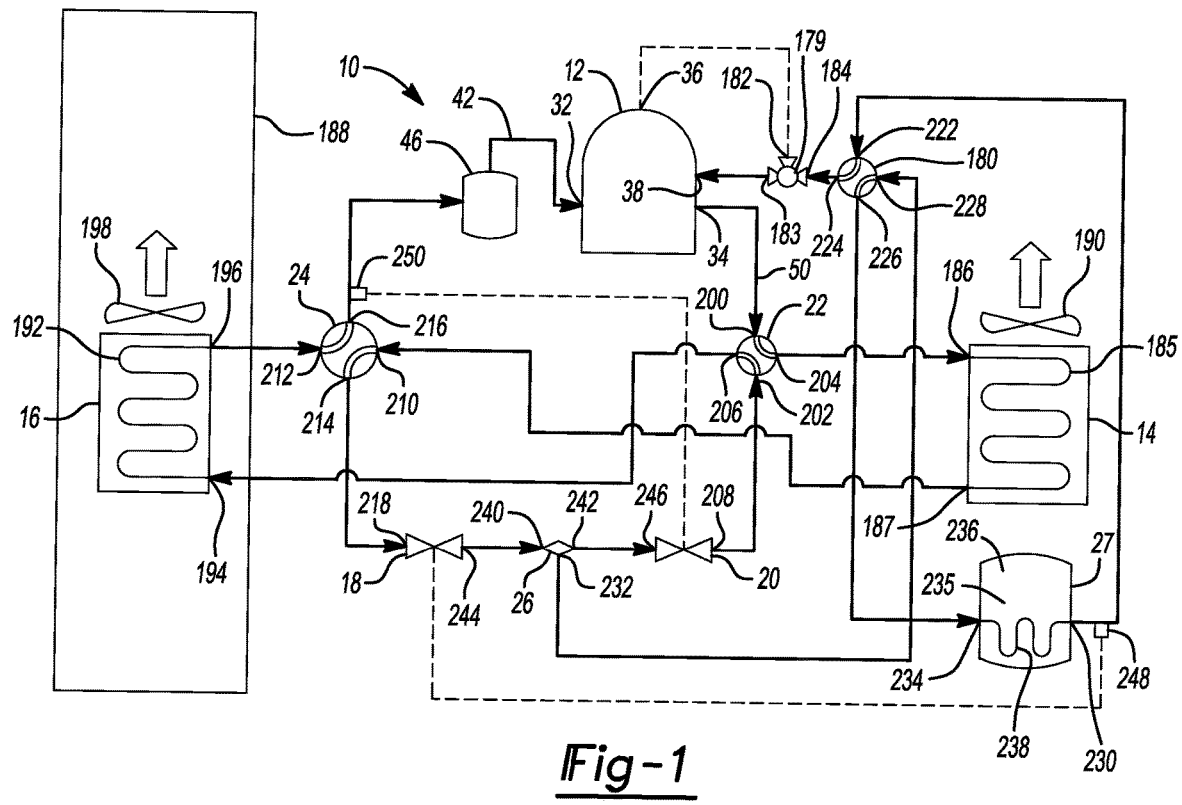
FIG. 1 is a schematic representation of a climate-control system operating in a cooling and charging mode according to the principles of the present disclosure.

Example embodiments will now be described more fully with reference to the accompanying drawings.

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 2:
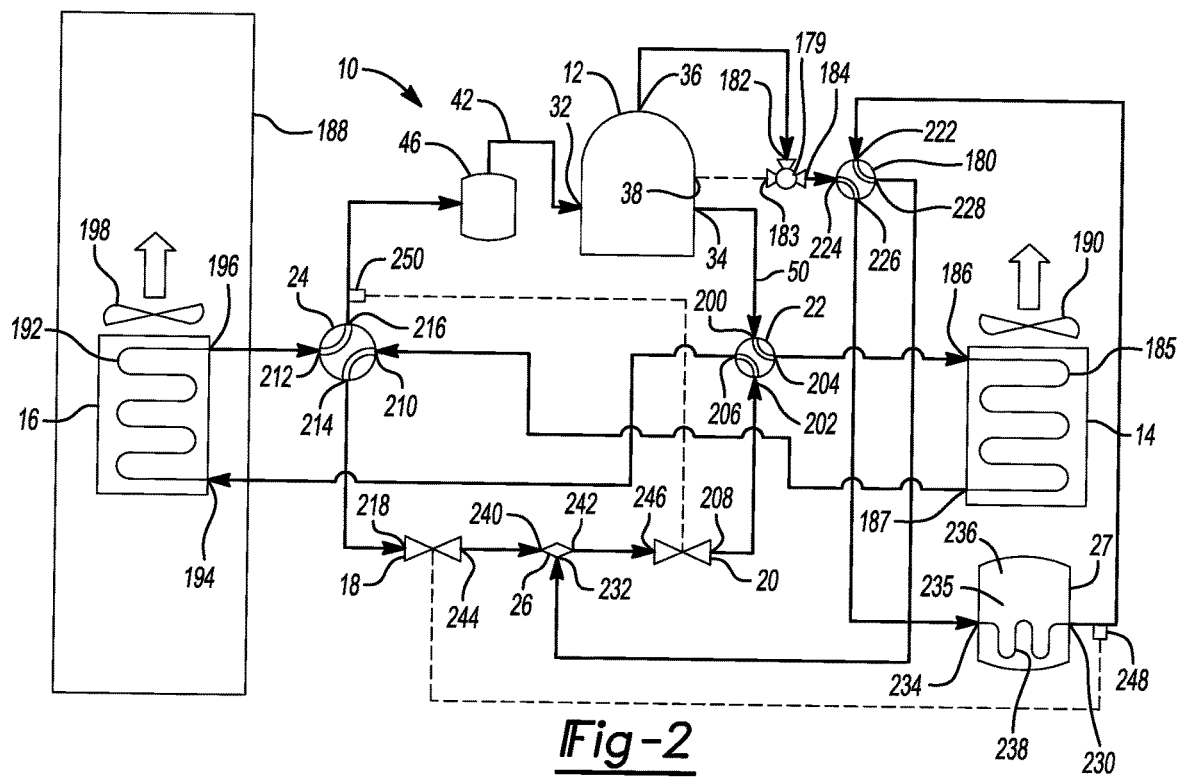
FIG. 2 is a schematic representation of the climate-control system operating in a cooling and discharging mode according to the principles of the present disclosure.
Figure 3:
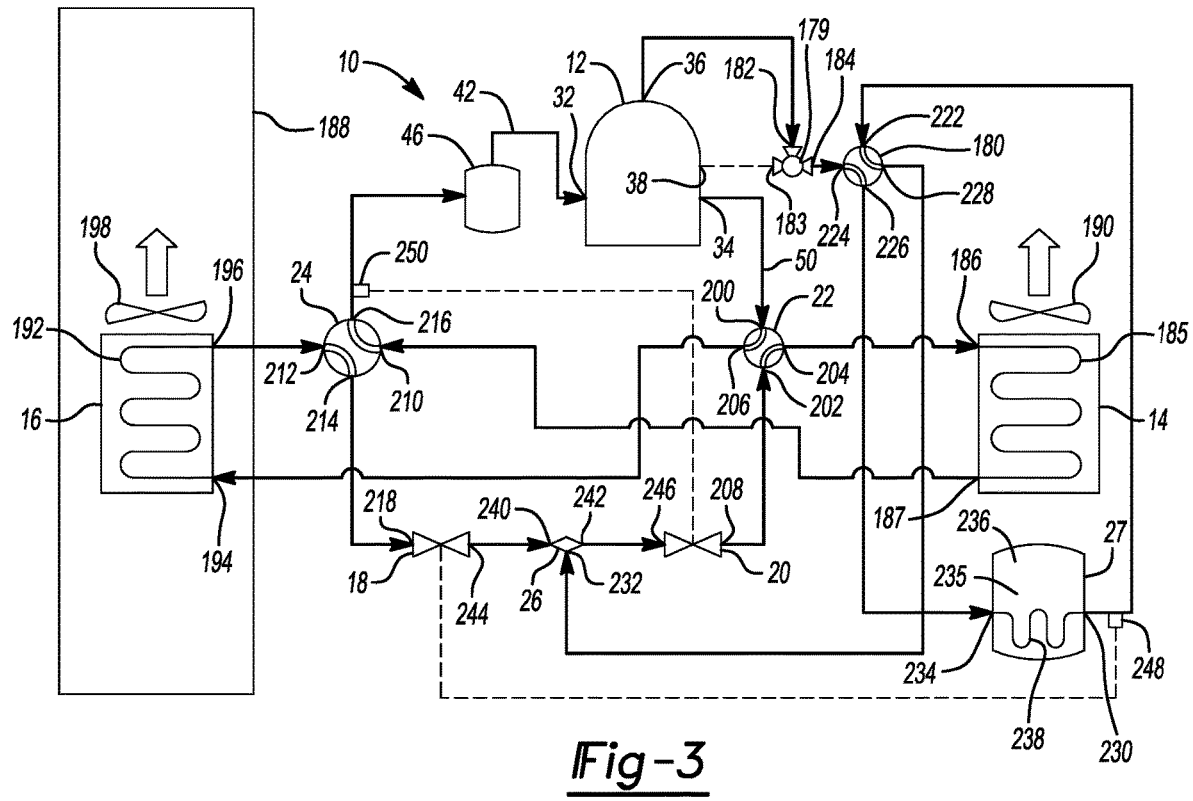
FIG. 3 is a schematic representation of the climate-control system operating in a heating and charging mode according to the principles of the present disclosure.
Figure 4:
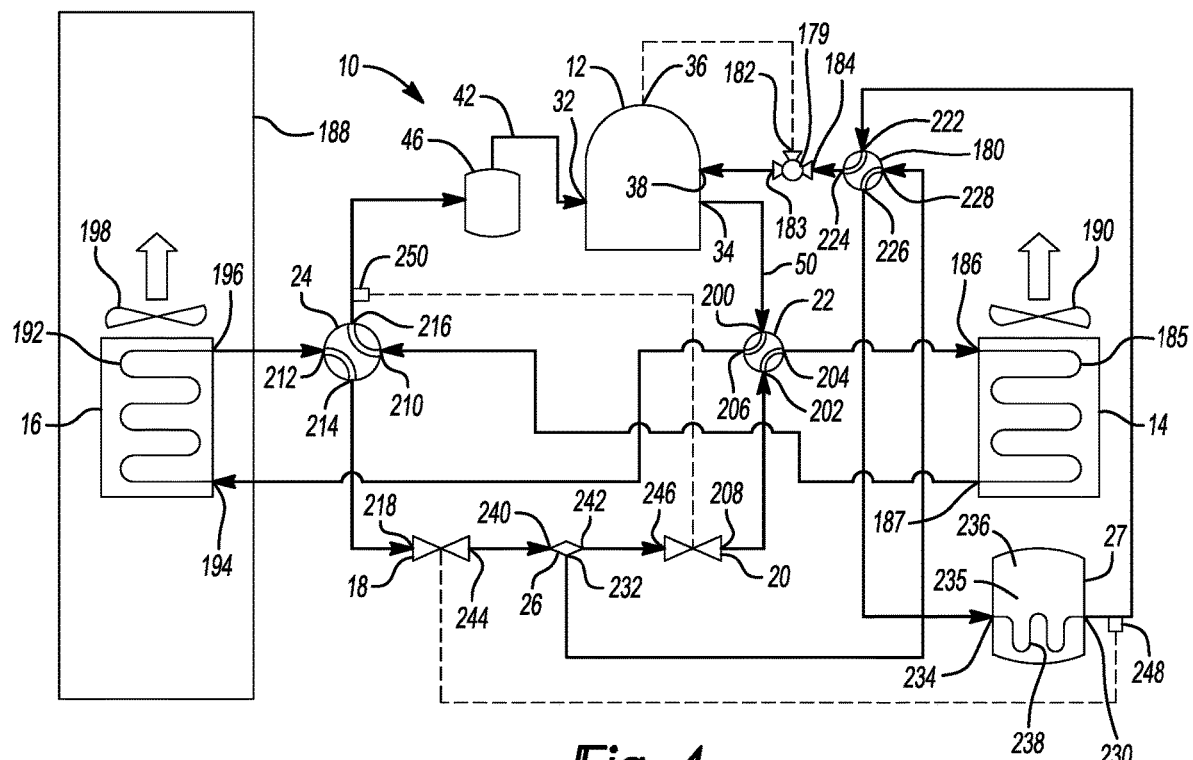
FIG. 4 is a schematic representation of the climate-control system operating in a heating and discharging mode according to the principles of the present disclosure.

With reference to FIGS. 1-4, a climate-control system 10 is provided. The climate-control system is operable in a cooling mode (FIGS. 1-2) and in a heating mode (FIGS. 3-4). The climate-control system 10 may include a fluid-circuit having a compressor 12, a first heat exchanger (e.g., an outdoor heat exchanger) 14, a second heat exchanger (e.g., an indoor heat exchanger) 16, a first expansion valve 18, a second expansion valve 20, a first reversing valve 22, a second reversing valve 24, a three-way junction 26, and a thermal storage device 27. The compressor 12 may pump working fluid (e.g., refrigerant, carbon dioxide, etc.) through the circuit. The thermal storage device 27 can be configured to facilitate energy storage in the form of heat (e.g., by the use of a phase-change material 236) that can be transferred to and from a working fluid of the climate-control system 10.

The climate-control system 10 may selectively "charge" (i.e., changing the temperature or phase within the thermal storage device 27 to a desired thermal storage device temperature) or "discharge" (i.e., changing the temperature or phase of the working fluid to a desired working fluid temperature) the thermal storage device 27 based on operating conditions such as time-of-day, energy costs, weather conditions (e.g., outdoor ambient air temperature), current state of the thermal storage device 27, and a temperature of air within a space to heated or cooled by the system 10, for example. The desired thermal storage device temperature and the desired working fluid temperature are temperatures determined by a control module 181 to optimize operation of the climate-control system 10 based on operating conditions, such as those listed above. The thermal storage capacity of the climate-control system 10 may be particularly beneficial to systems reliant on solar power, such that the system may charge when there is adequate solar power (e.g., during a sunny day) and may discharge when there is inadequate solar power (e.g., at night). The climate-control system 10 may also charge the thermal storage device 27 at non-peak electrical usage hours to avoid high electrical usage rates.

Figure 5:
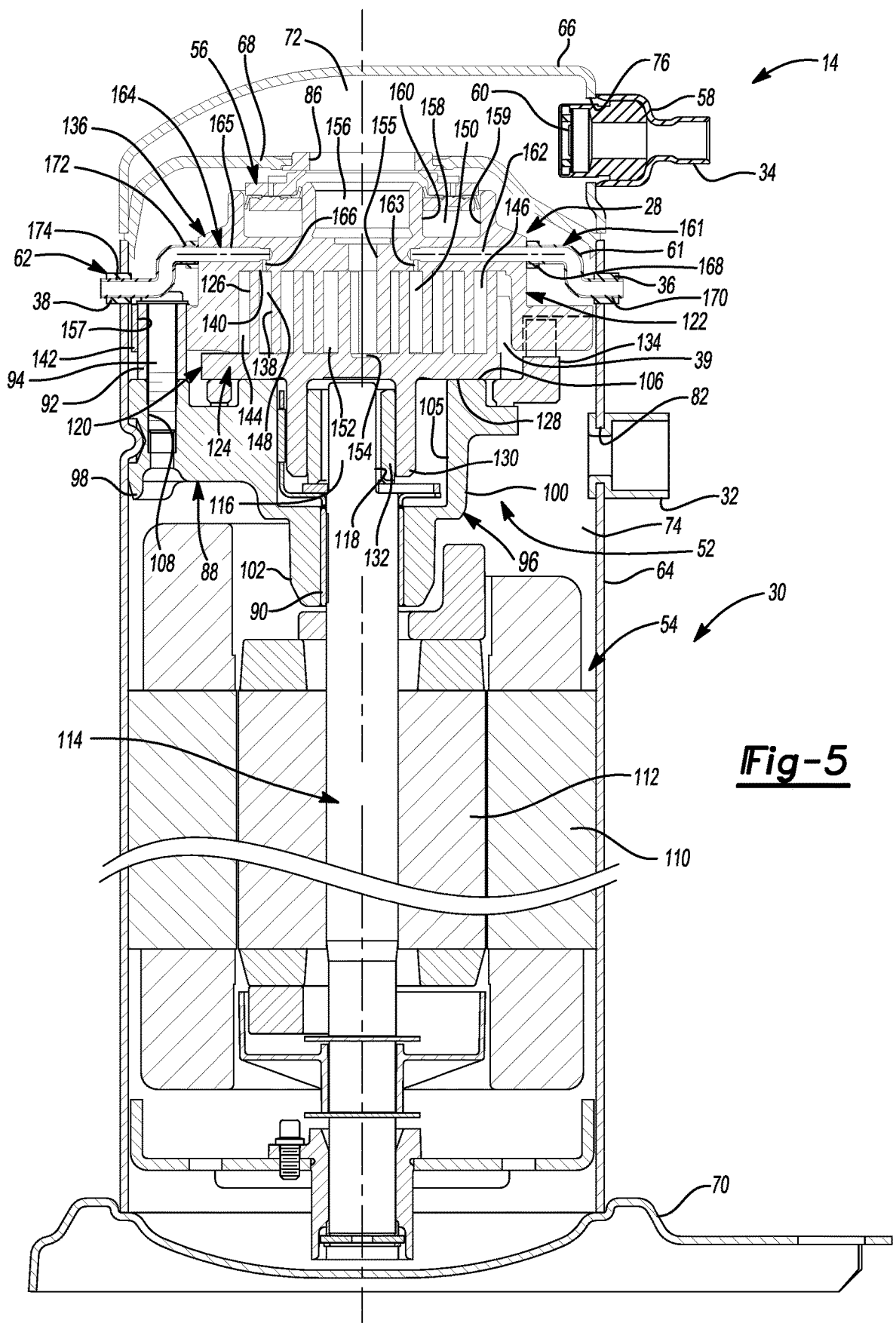
FIG. 5 is a cross-sectional view of a compressor of the climate-control system of FIGS. 1-4.

The compressor 12 may be any suitable type of compressor such as a scroll, rotary, reciprocating or screw compressor, for example. As shown in FIG. 5, the compressor 12 includes a compression mechanism 28 disposed within a hermetic shell assembly 30 having a suction inlet 32 (e.g., a first inlet fitting), a discharge outlet 34 (e.g., a first outlet fitting), an intermediate outlet port 36 (e.g., a second outlet fitting), and an intermediate inlet port 38 (e.g., a second inlet fitting). In some configurations, the compressor 12 may include a fixed-speed or variable-speed motor (not shown).

The suction inlet 32 may provide fluid to an internal suction inlet 39 of the compression mechanism 28 (e.g., a radially outermost pocket of a scroll compression mechanism). A suction line 42 (FIGS. 1-4) may be fluidly coupled to the suction inlet 32 of the compressor 12. Working fluid exiting a suction line accumulator 46 may flow through the suction line 42, the suction inlet 32 of the compressor 12, and the internal suction inlet 39 to be compressed by the compression mechanism 28 of the compressor 12. After the working fluid is compressed by the compression mechanism 28 of the compressor 12, the working fluid may be discharged by the compressor 12 by flowing through the discharge outlet 34 to a discharge line 50 (FIGS. 1-4) coupled to the discharge outlet 34.

As shown in FIG. 5, the compressor 12 may also include a main bearing housing assembly 52, a motor assembly 54, a seal assembly 56, a discharge fitting 58, a discharge valve assembly 60, a first vapor-injection conduit 61 (defining the intermediate outlet port 36), and a second vapor-injection conduit 62 (defining the intermediate inlet port 38). The shell assembly 30 may house the main bearing housing assembly 52, the motor assembly 54, the compression mechanism 28 and the seal assembly 56, and may at least partially house the first and second vapor-injection conduits 61, 62.

The shell assembly 30 may generally form a compressor housing and may include a cylindrical shell 64, an end cap 66 at the upper end thereof, a transversely extending partition 68 and a base 70 at a lower end thereof. The end cap 66 and the partition 68 may generally define a discharge chamber 72, while the cylindrical shell 64, the partition 68 and the base 70 may generally define a suction chamber 74. The discharge fitting 58 may be attached to the shell assembly 30 at an opening 76 in the end cap 66 and may be in fluid communication with the discharge line 50. The discharge valve assembly 60 may be located within the discharge fitting 58 and may generally prevent a reverse flow condition. The suction inlet 32 may be attached to the shell assembly 30 at an opening 82 such that the suction inlet 32 is in fluid communication with the suction chamber 74 and a suction line 42. The partition 68 may include a discharge passage 86 therethrough that provides communication between the compression mechanism 28 and the discharge chamber 72.

The main bearing housing assembly 52 may be affixed to the shell 64 at a plurality of points in any desirable manner, such as staking, for example. The main bearing housing assembly 52 may include a main bearing housing 88, a first bearing 90 disposed therein, bushings 92 and fasteners 94. The main bearing housing 88 may include a central body portion 96 having a series of arms 98 that extend radially outwardly therefrom. The central body portion 96 may include first and second portions 100, 102 having an opening 104 extending therethrough. The second portion 102 may house the first bearing 90 therein. The first portion 100 may define an annular flat thrust bearing surface 106 on an axial end surface thereof. Each arm 98 may include an aperture 108 extending therethrough that receives a respective fastener 94.

The motor assembly 54 may generally include a motor stator 110, a rotor 112, and a drive shaft 114. The motor stator 110 may be press-fit into the shell 64. The drive shaft 114 may be rotatably driven by the rotor 112. The rotor 112 may be press-fit onto the drive shaft 114. The drive shaft 114 may include an eccentric crank pin 116 having a flat surface 118 thereon.

The compression mechanism 28 may generally include an orbiting scroll 120 and a non-orbiting scroll 122. The orbiting scroll 120 may include an endplate 124 having a spiral vane or wrap 126 on the upper surface thereof and an annular flat thrust surface 128 on the lower surface. The thrust surface 128 may interface with the annular flat thrust bearing surface 106 on the main bearing housing 88. A cylindrical hub 130 may project downwardly from the thrust surface 128 and may have a drive bushing 132 rotatably disposed therein. The drive bushing 132 may include an inner bore in which the crank pin 116 is drivingly disposed. The crank pin flat surface 118 may drivingly engage a flat surface of the inner bore of the drive bushing 132 to provide a radially compliant driving arrangement. An Oldham coupling 134 may be engaged with the orbiting and non-orbiting scrolls 120, 122 to prevent relative rotation therebetween.

The non-orbiting scroll 122 may include an endplate 136 having a spiral wrap 138 on a lower surface 140 thereof and a series of radially outwardly extending flanged portions 142. The spiral wrap 138 may form a meshing engagement with the wrap 126 of the orbiting scroll 120, thereby creating a plurality of compression pockets, including a suction-pressure pocket 144, a plurality of intermediate-pressure pockets 146, 148, 150, 152, and a discharge-pressure pocket 154. The non-orbiting scroll 122 may be axially displaceable relative to the main bearing housing assembly 52, the shell assembly 30, and the orbiting scroll 120. The non-orbiting scroll 122 may include a discharge passage 155 in communication with the discharge-pressure pocket 154 and an upwardly open recess 156. The upwardly open recess 156 may be in fluid communication with the discharge chamber 72 via the discharge passage 86 in the partition 68.

The flanged portions 142 may include openings 157 therethrough. Each opening 157 may receive a respective bushing 92 therein. Each bushing 92 may receive a respective fastener 94. The respective fastener 94 may be engaged with the main bearing housing 88 to prevent rotation of the non-orbiting scroll 122 relative to the main bearing housing assembly 52. The non-orbiting scroll 122 may include an annular recess 158 in the upper surface thereof defined by parallel and coaxial inner and outer sidewalls 159, 160.

The seal assembly 56 may be located within the annular recess 158. In this way, the seal assembly 56 may be axially displaceable within the annular recess 158 relative to the shell assembly 30 and/or the non-orbiting scroll 122 to provide for axial displacement of the non-orbiting scroll 122 while maintaining a sealed engagement with the partition 68 to isolate the discharge chamber 72 from the suction chamber 74. More specifically, in some configurations, pressure within the annular recess 158 may urge the seal assembly 56 into engagement with the partition 68, and the spiral wrap 138 of the non-orbiting scroll 122 into engagement with the endplate 124 of the orbiting scroll 120, during normal compressor operation.

The endplate 136 may include a first injection passage 161 formed therein. The first injection passage 161 may be in fluid communication with the first vapor-injection conduit 61 and with one or more of the intermediate-pressure pockets 146, 148, 150, 152 and may include a radially extending portion 162 and an axially extending portion 163. The first injection passage 161 may be configured to allow the working fluid from the one or more intermediate-pressure pockets 146, 148, 150, 152 to flow into the first vapor-injection conduit 61.

The endplate 136 may include a second injection passage 164 formed therein. The second injection passage 164 may be in fluid communication with the second vapor-injection conduit 62 and with one or more of the intermediate-pressure pockets 146, 148, 150, 152, and may include a radially extending portion 165 and an axially extending portion 166. The second injection passage 164 may be configured to allow the working fluid from the second vapor-injection conduit 62 to flow into the one or more of the intermediate-pressure pockets 146, 148, 150, 152.

The intermediate inlet port 38 is fluidly connected to an intermediate-pressure pocket 146, 148, 150, 152 which has a lower operating pressure than the intermediate-pressure pocket 146, 148, 150, 152 fluidly connected to the intermediate outlet port 36. For example, in the embodiment shown in FIG. 5, the intermediate outlet port 36 is fluidly connected to intermediate-pressure pocket 152 and the intermediate inlet port 38 is fluidly connected to intermediate-pressure pocket 146.

The first vapor-injection conduit 61 may be at least partially disposed in the shell 64 and may be attached to the shell 64 at an opening thereof. The first vapor-injection conduit 61 may include a first end 168 in fluid communication with the first injection passage 161 and a second end 170 attached to the shell.

The second vapor-injection conduit 62 may be at least partially disposed in the shell 64 and may be attached to the shell 64 at an opening thereof. The second vapor-injection conduit 62 may include a first end 172 in fluid communication with the second injection passage 164 and a second end 174 attached to the shell 64.

As shown in FIGS. 1-4, the climate-control system 10 may be configured to allow fluid to flow from the intermediate outlet port 36 to a three-way valve 179 and to allow fluid to flow from the three-way valve 179 to the intermediate inlet port 38. The three-way valve 179 may be in fluid communication with a third reversing valve 180. The three-way valve 179 may operate as a solenoid valve, in which the three-way valve 179 is in communication with the control module 181, such that the at least one of the intermediate outlet and inlet ports 36, 38 may be bypassed.

A first port 182 of the three-way valve 179 may be in fluid communication with the intermediate outlet port 36 of the compressor 12. A second port 183 of the three-way valve 179 may be in fluid communication with the intermediate inlet port 38 of the compressor. A third port 184 of the three-way valve 179 may be in fluid communication with the third reversing valve 180.

The first heat exchanger 14 may include a coil (or conduit) 185 having an inlet 186 and an outlet 187. The first heat exchanger 14 may be disposed outside of a building (or house) 188. A first fan 190 may force air across the first heat exchanger 14 to facilitate heat transfer between outdoor ambient air and working fluid flowing through the coil 185. Similarly, the second heat exchanger 16 may include a coil (or conduit) 192 having an inlet 194 and an outlet 196. The second heat exchanger 16 may be disposed inside of a building (or house) 188. A second fan 198 may force air across the second heat exchanger 16 to facilitate heat transfer between working fluid in the coil 192 and air in the building 188 to heat a space within the building 188 in the heating mode or cool the space within the building 188 in the cooling mode.

The first and second reversing valves 22, 24 are movable between a first position (FIGS. 1-2) corresponding to the cooling mode of the climate-control system 10 and a second position (FIGS. 3-4) corresponding to the heating mode of the climate-control system 10. Each of the first and second reversing valves 22, 24 can include a movable valve member (e.g., a slidable body or a rotatable body) that is movable between the first and second positions and can be actuated by a solenoid, stepper motor, or fluid pressure. The control module 181 may control operation of the first and second reversing valves 22, 24 and controls movement between the first and second positions. The control module 181 may also control operation of the first and second expansion valves 18, 20 (e.g., based on data from a temperature sensor and/or other operating parameters), the compressor 12, and the fans 190, 198 of the first and second heat exchangers 14, 16.

The first reversing valve 22 may include a first inlet 200, a second inlet 202, a first outlet 204, and a second outlet 206. The valve member of the first reversing valve 22 is movable relative to the inlets 200, 202 and outlets 204, 206 between the first and second positions. The first inlet 200 of the first reversing valve 22 is fluidly connected to the discharge outlet 34 of the compressor 12. The second inlet 202 of the first reversing valve 22 is fluidly connected to an outlet 208 of the second expansion valve 20. The first outlet 204 of the first reversing valve 22 is fluidly connected to the inlet 186 of the first heat exchanger 14. The second outlet 206 of the first reversing valve 22 is fluidly connected to the inlet 194 of the second heat exchanger 16.

The second reversing valve 24 may include a first inlet 210, a second inlet 212, a first outlet 214, and a second outlet 216. The valve member of the second reversing valve 24 is movable relative to the inlets 210, 212 and outlets 214, 216 between the first and second positions. The first inlet 210 of the second reversing valve 24 is fluidly connected to the outlet 187 of the first heat exchanger 14. The second inlet 212 of the second reversing valve 24 is fluidly connected to the outlet 196 of the second heat exchanger 16. The first outlet 214 of the second reversing valve 24 is fluidly connected to an inlet 218 of the first expansion valve 18. The second outlet 216 of the second reversing valve 24 is fluidly connected to the accumulator 46 (or to the suction inlet 32 of the compressor 12).

The climate-control system 10 may also include a third reversing valve 180. The third reversing valve 180 may be movable between a first position (FIGS. 1 & 4) and a second position (FIGS. 2-3). The third reversing valve 180 can include a movable valve member (e.g., a slidable body or a rotatable body) that is movable between the first and second positions and can be actuated by a solenoid, stepper motor, or fluid pressure. The control module 181 may control operation of the third reversing valve 180 and controls movement between the first and second positions.

The third reversing valve 180 may include a first port 222, a second port 224, a third port 226, and a fourth port 228. The valve member of the third reversing valve 180 is movable relative to the ports 222, 224, 226, 228 between the first and second positions. The first port 222 of the third reversing valve 180 may operate as an inlet to the third reversing valve 180. The third port 226 of the third reversing valve 180 may operate as an outlet from the third reversing valve 180. The second and fourth ports 224, 228 of the third reversing valve 180 may operate as both inlets and outlets, depending on the mode of operation of the climate-control system 10. The first port 222 of the third reversing valve 180 is fluidly connected to an outlet 230 of the thermal storage device 27. The second port 224 of the third reversing valve 180 is fluidly connected to the third port 184 of the three-way valve 179. The third port 226 of the third reversing valve 180 is fluidly connected to an inlet 234 of the thermal storage device 27. The fourth port 228 of the third reversing valve 180 is fluidly connected to a first port 232 of the three-way junction 26.

The thermal storage device 27 may include a storage tank 235 containing the phase-change material 236. The thermal storage device 27 may include a conduit (or coil) 238 disposed within the storage tank 235. The conduit 238 may extend between and be fluidly connected with the inlet 234 and the outlet 230. The conduit 238 may be surrounded by, submerged in, or otherwise in a heat-transfer relationship with the phase-change material 236 such that heat is exchanged between the phase-change material 236 and the working fluid within the conduit 238. The thermal storage device 27 may be insulated as to reduce heat transfer between the phase-change material 236 and the ambient environment. The phase-change material 236 may be or include paraffin, salt hydrate, and/or other phase-change materials.

The three-way junction 26 includes the first port 232, a second port 240, and a third port 242. The climate-control system 10 may be configured to allow the working fluid to flow from an outlet 244 of the first expansion valve 18 to the second port 240 of the three-way junction 26 and to allow the working fluid to flow from the third port 242 of the three-way junction 26 to an inlet 246 of the second expansion valve 20. The climate-control system 10 may be configured to allow the working fluid to flow through the first port 232 of the three-way junction 26 to either enter the three-way junction 26 or to exit the three-way junction 26, depending on the mode of operation.

Figure 6:
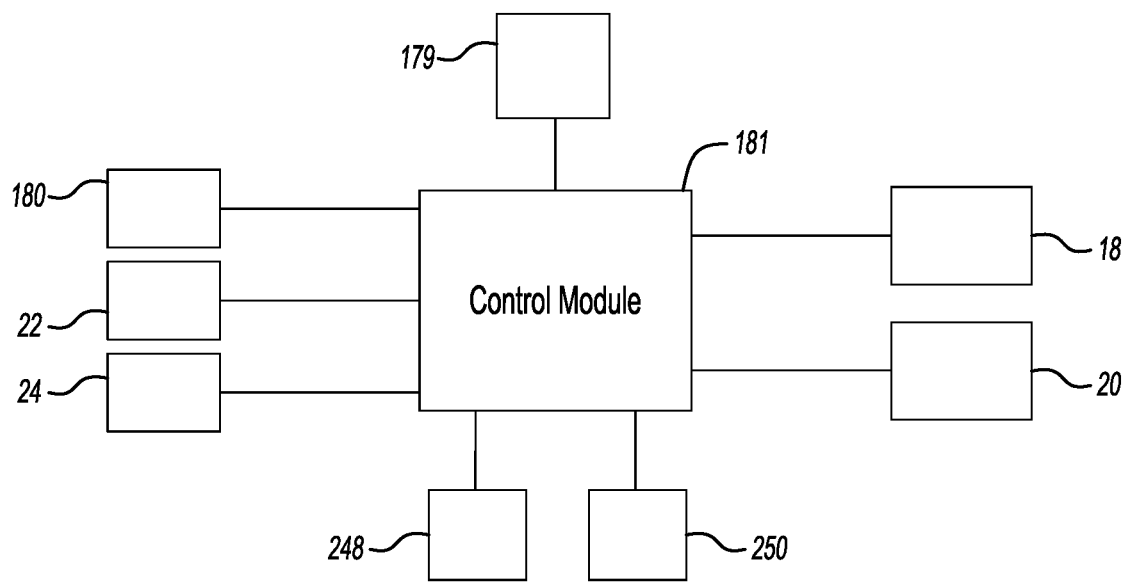
FIG. 6 is a schematic representation of a control module of the climate-control system of FIGS. 1-4.

Referring to FIG. 6, at least one sensor 248, 250 may be configured to measure characteristics of at least one point of the climate-control system 10. These characteristics may include temperature, pressure, and/or flow rate of the working fluid. The control module 181 may receive the data from the at least one sensor 248, 250 and may interpret the data to determine a status of the climate-control system 10. In response to the data provided by the at least one sensor 248, 250 the control module 181 may provide direction to the first and second expansion valves 18, 20 and the first, second, and third reversing valves 22, 24, 180. For example, in the embodiment shown in FIGS. 1-4, the operation of the first expansion valve 18 is dependent on data measured by the sensor 248 located between the three-way valve 179 and the conduit 238 of the thermal storage device 27 and the operation of the second expansion valve 20 is dependent on data measured by the sensor 250 located between first outlet 214 of the second reversing valve 24 and the accumulator 46.

With reference to FIGS. 1-4, operation of the climate-control system 10 will be described in detail. When the climate-control system 10 is in the cooling and charging mode (FIG. 1): (a) the first reversing valve 22 is configured such that the first inlet 200 of the first reversing valve 22 is fluidly connected with the first outlet 204 of the first reversing valve 22, (b) the first reversing valve 22 is configured such that the second inlet 202 of the first reversing valve 22 is fluidly connected with the second outlet 206 of the first reversing valve 22, (c) the second reversing valve 24 is configured such that the first inlet 210 of the second reversing valve 24 is fluidly connected with the first outlet 214 of the second reversing valve 24, (d) the second reversing valve 24 is configured such that the second inlet 212 of the second reversing valve 24 is fluidly connected with the second outlet 216 of the second reversing valve 24, (e) the third reversing valve 180 is configured such that the first port 222 of the third reversing valve 180 is fluidly connected with the second port 224 of the third reversing valve 180, and (f) the third reversing valve 180 is configured such that the fourth port 228 of the third reversing valve 180 is fluidly connected with the third port 226 of the third reversing valve 180. The three-way valve 179 is configured to allow working fluid from the second port 224 of the third reversing valve 180 to flow to the intermediate inlet port 38 of the compression mechanism 28 and to prevent flow out of the intermediate outlet port 36 of the compression mechanism 28.

Operation of the climate-control system 10 in the cooling and charging mode (shown in FIG. 1) will now be described in detail. Compressed working fluid is discharged from the compressor 12 through the discharge outlet 34. The first reversing valve 22 is positioned to allow the compressed working fluid to flow from the discharge outlet 34 into the first inlet 200 of the first reversing valve 22 and to the first outlet 204 of the first reversing valve 22. From the first outlet 204 of the first reversing valve 22, the working fluid flows into the inlet 186 of the first heat exchanger 14, through the coil 185 of the first heat exchanger 14 (where heat is transferred from the working fluid to the outdoor ambient air outside of the building 188) and exits the first heat exchanger 14 through the outlet 187.

From the outlet 187 of the first heat exchanger 14, the working fluid flows into the first inlet 210 of the second reversing valve 24. The second reversing valve 24 is positioned to allow the working fluid to flow from the first inlet 210 of the second reversing valve 24 to the first outlet 214 of the second reversing valve 24. From the first outlet 214 of the second reversing valve 24, the working fluid flows into the inlet 218 of the first expansion valve 18. As the working fluid flows through the first expansion valve 18, the temperature and pressure of the working fluid are lowered. The working fluid flows out of the first expansion valve 18 through the outlet 244. From the outlet 244 of the first expansion valve 18, the working fluid flows into the second port 240 of the three-way junction 26.

From the second port 240, a first portion of the working fluid flows through the first port 232 of the three-way junction 26 to the fourth port 228 of the third reversing valve 180. The third reversing valve 180 allows the first portion of the working fluid to flow out of the third reversing valve 180 through the third port 226 and to then flow to the inlet 234 of the thermal storage device 27. The first portion of the working fluid continues through the conduit 238 of the thermal storage device 27 and exits the thermal storage device 27 through the outlet 230 of the thermal storage device 27. The first portion of the working fluid in the conduit 238 absorbs heat from the phase-change material 236 to decrease the temperature of the phase-change material 236 or to transition the phase-change material 236 from a liquid state to a solid state.

The first portion of the working fluid then flows through the first port 222 of the third reversing valve 180 to the second port 224 of the third reversing valve 180, as allowed by the positioning of the third reversing valve 180. From the third reversing valve 180, the first portion of the working fluid flows through the third port 184 of the three-way valve 179. The three-way valve 179 is configured to allow the first portion of the working fluid to flow through second port 183 of the three-way valve 179 to the intermediate inlet port 38. The intermediate inlet port 38 is configured such that the first portion of the working fluid is allowed to flow into the intermediate-pressure pocket 150 of the compression mechanism 28.

A second portion of the working fluid flows from the third port 242 of the three-way junction 26 to the inlet 246 of the second expansion valve 20. As the second portion of the working fluid flows through the second expansion valve 20, the temperature and pressure of the second portion of the working fluid are lowered. From the outlet 208 of the second expansion valve 20, the second portion of the working fluid flows into the second inlet 202 of the first reversing valve 22. The first reversing valve 22 allows the working fluid to flow from the second inlet 202 to the second outlet 206. From the second outlet 206 of the first reversing valve 22, the second portion of the working fluid flows into the inlet 194 of the second heat exchanger 16, through the coil 192 of the second heat exchanger 16 (where the working fluid absorbs heat from air within the building 188) and out of the second heat exchanger 16 through the outlet 196.

After the second portion of the working fluid exits the outlet 196 of the second heat exchanger 16, the second portion of the working fluid flows to the second inlet 212 of the second reversing valve 24. The second reversing valve 24 is positioned to allow the second portion of the working fluid to flow from the second inlet 212 to the second outlet 216. After exiting the second reversing valve 24 through the second outlet 216, the second portion of the working fluid flows to the suction inlet 32 of the compressor 12. In some configurations, the second portion of the working fluid flows from the second outlet 216 to the accumulator 46 then to the suction inlet 32 of the compressor.

When the climate-control system 10 is in the cooling and discharging mode (FIG. 2): (a) the first reversing valve 22 is configured such that the first inlet 200 of the first reversing valve 22 is fluidly connected with the first outlet 204 of the first reversing valve 22, (b) the first reversing valve 22 is configured such that the second inlet 202 of the first reversing valve 22 is fluidly connected with the second outlet 206 of the first reversing valve 22, (c) the second reversing valve 24 is configured such that the first inlet 210 of the second reversing valve 24 is fluidly connected with the first outlet 214 of the second reversing valve 24, (d) the second reversing valve 24 is configured such that the second inlet 212 of the second reversing valve 24 is fluidly connected with the second outlet 216 of the second reversing valve 24, (e) the third reversing valve 180 is configured such that the first port 222 of the third reversing valve 180 is fluidly connected with the fourth port 228 of the third reversing valve 180, and (f) the third reversing valve 180 is configured such that the second port 224 of the third reversing valve 180 is fluidly connected with the third port 226 of the third reversing valve 180. The three-way valve 179 is configured to allow working fluid from the intermediate outlet port 36 of the compression mechanism 28 to flow through second port 224 of the third reversing valve 180 and to prevent flow to the intermediate inlet port 38 of the compression mechanism 28.

Operation of the climate-control system 10 in the cooling and discharging mode (shown in FIG. 2) will now be described in detail. A first portion of compressed working fluid is discharged from the compressor 12 through the discharge outlet 34. The first reversing valve 22 is positioned to allow the first portion of the working fluid to flow into the first inlet 200 of the first reversing valve 22 and to exit the first reversing valve 22 through the first outlet 204 of the first reversing valve 22. From the first outlet 204 of the first reversing valve 22, the first portion of the working fluid flows into the inlet 186 of the first heat exchanger 14, through the coil 185 of the first heat exchanger 14 (where the first portion of the working fluid transfers heat to the outdoor ambient air outside of the building 188) and exits the first heat exchanger 14 through the outlet 187.

From the outlet 187 of the first heat exchanger 14, the first portion of the working fluid flows into the first inlet 210 of the second reversing valve 24. The second reversing valve 24 is positioned to allow the first portion of the working fluid to flow from the first inlet 210 of the second reversing valve 24 to the first outlet 214 of the second reversing valve 24. From the first outlet 214 of the second reversing valve 24, the first portion of the working fluid flows into the inlet 218 of the first expansion valve 18. As the first portion of the working fluid flows through the first expansion valve 18, the temperature and pressure of the first portion of the working fluid are lowered. The first portion of the working fluid flows out of the first expansion valve 18 through the outlet 244. From the outlet 244 of the first expansion valve 18, the working fluid flows into the second port 240 of the three-way junction 26.

A second portion of the working fluid is discharged from the compressor 12 through the intermediate-pressure pocket 150 of the compression mechanism 28 to the intermediate outlet port 36. The second portion of the working fluid then flows to the first port 182 of the three-way valve 179. The three-way valve 179 allows the second portion of the working fluid to flow out of the three-way valve 184 via the third port 184. The second portion of the working fluid then flows to the second port 224 of the third reversing valve 180. The third reversing valve 180 is positioned to allow the second portion of the fluid to flow out of the third reversing valve 180 through the third port 226 of the third reversing valve 180.

From the third reversing valve 180, the second portion of the working fluid flows to the inlet 234 of the thermal storage device 27 and passes through the conduit 238 of the thermal storage device 27 to the outlet 230 of the thermal storage device 27. The temperature of the second portion of the working fluid in the conduit 238 is cooled by transferring heat to the phase-change material 236 of the thermal storage device 27. The second portion of the working fluid then flows through the first port 222 of the third reversing valve 180 to the fourth port 228 of the third reversing valve 180, as allowed by the positioning of the third reversing valve 180. From the fourth port 228 of the third reversing valve 180, the second portion of the working flows into the first port 232 of the three-way junction 26.

The first portion of the working fluid flowing into the second port 240 of the three-way junction 26 and the second portion of the working fluid flowing into the first port 232 of the three-way junction 26 combine to form a single stream of working fluid as the working fluid flows out of the three-way junction 26 through the third port 242.

The working fluid flows from the third port 242 of the three-way junction 26 to the inlet 246 of the second expansion valve 20. As the working fluid flows through the second expansion valve 20, the temperature and pressure of the working fluid are lowered. From the outlet 208 of the second expansion valve 20, the working fluid flows into the second inlet 202 of the first reversing valve 22. The first reversing valve 22 is positioned to allow the working fluid to flow from the second inlet 202 to the second outlet 206. From the second outlet 206 of the first reversing valve 22, the working fluid flows into the inlet 194 of the second heat exchanger 16, through the coil 192 of the second heat exchanger 16 (where the working fluid absorbs heat from air within the building 188), and out of the second heat exchanger 16 through the outlet 196.

After the working fluid exits the outlet 196 of the second heat exchanger 16, the working fluid flows to the second inlet 212 of the second reversing valve 24. The second reversing valve 24 is positioned to allow the working fluid to flow out of the second reversing valve 24 through the second outlet 216. After exiting the second reversing valve 24 through the second outlet 216, the working fluid flows to the suction inlet 32 of the compressor 12. In some configurations, the second portion of the working fluid flows from the second outlet 216 to the accumulator 46 then to the suction inlet 32 of the compressor.

When the climate-control system 10 is in the heating and charging mode (FIG. 3): (a) the first reversing valve 22 is configured such that the first inlet 200 of the first reversing valve 22 is fluidly connected with the second outlet 206 of the first reversing valve 22, (b) the first reversing valve 22 is configured such that the second inlet 202 of the first reversing valve 22 is fluidly connected with the first outlet 204 of the first reversing valve 22, (c) the second reversing valve 24 is configured such that the first inlet 210 of the second reversing valve 24 is fluidly connected with the second outlet 216 of the second reversing valve 24, (d) the second reversing valve 24 is configured such that the second inlet 212 of the second reversing valve 24 is fluidly connected with the first outlet 214 of the second reversing valve 24, (e) the third reversing valve 180 is configured such that the first port 222 of the third reversing valve 180 is fluidly connected with the fourth port 228 of the third reversing valve 180, and (f) the third reversing valve 180 is configured such that the second port 224 of the third reversing valve 180 is fluidly connected with the third port 226 of the third reversing valve 180. The three-way valve 179 is configured to allow working fluid from the intermediate outlet port 36 of the compression mechanism 28 to flow through second port 224 of the third reversing valve 180 and to prevent flow to the intermediate inlet port 38 of the compression mechanism 28.

Operation of the climate-control system 10 in the heating and charging mode (shown in FIG. 3) will now be described in detail. A first portion of compressed working fluid is discharged from the compressor 12 through the discharge outlet 34. The first reversing valve 22 is positioned to allow the first portion of the working fluid to flow into the first inlet 200 of the first reversing valve 22 and to exit the first reversing valve 22 through the second outlet 206 of the first reversing valve 22. From the second outlet 206 of the first reversing valve 22, the first portion of the working fluid flows into the inlet 194 of the second heat exchanger 16, through the coil 192 of the second heat exchanger 16 (where the first portion of the working fluid transfers heat to air within the building 188) and exits the second heat exchanger 16 through the outlet 196.

From the outlet 196 of the second heat exchanger 16, the first portion of the working fluid flows into to the second inlet 212 of the second reversing valve 24. The second reversing valve 24 is positioned to allow the first portion of the working fluid to flow from the second inlet 212 of the second reversing valve 24 to the first outlet 214 of the second reversing valve 24. From the first outlet 214 of the second reversing valve 24, the first portion of the working fluid flows into the inlet 218 of the first expansion valve 18. As the first portion of the working fluid flows through the first expansion valve 18, the temperature and pressure of the first portion of the working fluid are lowered. The first portion of the working fluid flows out of the first expansion valve 18 through the outlet 244. From the outlet 244 of the first expansion valve 18, the first portion of the working fluid flows into the second port 240 of the three-way junction 26.

A second portion of the working fluid is discharged from the compressor 12 through the intermediate-pressure pocket 150 of the compression mechanism 28 to the intermediate outlet port 36. The second portion of the working fluid then flows to the first port 182 of the three-way valve 179. The three-way valve 179 allows the second portion of the working fluid to flow out of the third port 184 of the three-way valve 179. The second portion of the working fluid then flows to the second port 224 of the third reversing valve 180. The third reversing valve 180 is positioned to allow the second portion of the fluid to flow out of the third reversing valve 180 through the third port 226 of the third reversing valve 180.

From the third reversing valve 180, the second portion of the working fluid flows to the inlet 234 of the thermal storage device 27 and passes through the conduit 238 of the thermal storage device 27 to the outlet 230 of the thermal storage device 27. The second portion of the working fluid in the conduit 238 transfers heat to the phase-change material 236 to increase the temperature of the phase-change material 236 or to transition the phase-change material 236 from the solid state to the liquid state. The second portion of the working fluid then flows through the first port 222 of the third reversing valve 180 to the fourth port 228 of the third reversing valve 180, as allowed by the positioning of the third reversing valve 180. From the fourth port 228 of the third reversing valve 180, the second portion of the working flows into the first port 232 of the three-way junction 26.

The first portion of the working fluid flowing into the second port 240 of the three-way junction 26 and the second portion of the working fluid flowing into the first port 232 of the three-way junction 26 combine to form a single stream of working fluid as the working fluid flows out of the three-way junction 26 through the third port 242.

The working fluid flows from the third port 242 of the three-way junction 26 to the inlet 246 of the second expansion valve 20. As the working fluid flows through the second expansion valve 20, the temperature and pressure of the working fluid are lowered. From the outlet 208 of the second expansion valve 20, the working fluid flows into the second inlet 202 of the first reversing valve 22. The first reversing valve 22 is positioned to allow the working fluid to flow from the second inlet 202 to the first outlet 204. From the first outlet 204 of the first reversing valve 22, the working fluid flows into the inlet 186 of the first heat exchanger 14, through the coil 185 of the first heat exchanger 14 (where the working fluid absorbs heat from the outdoor ambient air outside of the building 188) and exits the first heat exchanger 14 through the outlet 187.

From the outlet 187 of the first heat exchanger 14, the working fluid flows into the first inlet 210 of the second reversing valve 24. The second reversing valve 24 is positioned to allow the working fluid to flow from the first inlet 210 of the second reversing valve 24 to the second outlet 216 of the second reversing valve 24. After exiting the second reversing valve 24 through the second outlet 216, the working fluid flows to the suction inlet 32 of the compressor 12. In some configurations, the second portion of the working fluid flows from the second outlet 216 to the accumulator 46 then to the suction inlet 32 of the compressor.

When the climate-control system 10 is in the heating and discharging mode (FIG. 4): (a) the first reversing valve 22 is configured such that the first inlet 200 of the first reversing valve 22 is fluidly connected with the second outlet 206 of the first reversing valve 22, (b) the first reversing valve 22 is configured such that the second inlet 202 of the first reversing valve 22 is fluidly connected with the first outlet 204 of the first reversing valve 22, (c) the second reversing valve 24 is configured such that the first inlet 210 of the second reversing valve 24 is fluidly connected with the second outlet 216 of the second reversing valve 24, (d) the second reversing valve 24 is configured such that the second inlet 212 of the second reversing valve 24 is fluidly connected with the first outlet 214 of the second reversing valve 24, (e) the third reversing valve 180 is configured such that the first port 222 of the third reversing valve 180 is fluidly connected with the second port 224 of the third reversing valve 180, and (f) the third reversing valve 180 is configured such that the fourth port 228 of the third reversing valve 180 is fluidly connected with the third port 226 of the third reversing valve 180. The three-way valve 179 is configured to allow working fluid from the second port 224 of the third reversing valve 180 to flow to the intermediate inlet port 38 of the compression mechanism 28 and to prevent flow out of the intermediate outlet port 36 of the compression mechanism 28.

Operation of the climate-control system 10 in the heating and discharging mode (shown FIG. 4) will be described in detail. Compressed working fluid is discharged from the compressor 12 through the discharge outlet 34. The first reversing valve 22 is positioned to allow the compressed working fluid to flow from the discharge outlet 34 into the first inlet 200 of the first reversing valve 22 and to exit the first reversing valve 22 through the second outlet 206 of the first reversing valve 22. From the second outlet 206 of the first reversing valve 22, the working fluid flows into the inlet 194 of the second heat exchanger 16, through the coil 192 of the second heat exchanger 16 (where the working fluid transfers heat to air within the building 188) and exits the second heat exchanger 16 through the outlet 196.

From the outlet 196 of the second heat exchanger 16, the working fluid flows into to the second inlet 212 of the second reversing valve 24. The second reversing valve 24 is positioned to allow the working fluid to flow from the second inlet 212 of the second reversing valve 24 to the first outlet 214 of the second reversing valve 24. From the first outlet 214 of the second reversing valve 24, the working fluid flows into the inlet 218 of the first expansion valve 18. As the working fluid flows through the first expansion valve 18, the temperature and pressure of the working fluid are lowered. The working fluid flows out of the first expansion valve 18 through the outlet 244. From the outlet 244 of the first expansion valve 18, the working fluid flows into the second port 240 of the three-way junction 26.

From the second port 240, a first portion of the working fluid flows through the first port 232 of the three-way junction 26 to the fourth port 228 of the third reversing valve 180. The third reversing valve 180 is positioned to allow the first portion of the working fluid to flow out of the third reversing valve 180 through the third port 226 and to then flow to the inlet 234 of the thermal storage device 27. The first portion of the working fluid continues through the conduit 238 of the thermal storage device 27 and exits the thermal storage device 27 through the outlet 230 of the thermal storage device 27. The first portion of the working fluid in the conduit 238 absorbs heat from the phase-change material 236 of the thermal storage device 27.

The first portion of the working fluid then flows through the first port 222 of the third reversing valve 180 to the second port 224 of the third reversing valve, as allowed by the positioning of the third reversing valve 180. From the third reversing valve 180, the first portion of the working fluid flows through the third port 184 of the three-way valve 179. The three-way valve 179 allows the first portion of the working fluid to flow through second port 183 of the three-way valve 179 to the intermediate inlet port 38. The intermediate inlet port 38 allows the first portion of the working fluid to flow into the intermediate-pressure pocket 148 of the compression mechanism 28.

A second portion of the working fluid flows from the third port 242 of the three-way junction 26 to the inlet 246 of the second expansion valve 20. As the second portion of the working fluid flows through the second expansion valve 20, the temperature and pressure of the second portion of the working fluid are lowered. From the outlet 208 of the second expansion valve 20, the second portion of the working fluid flows into the first inlet 200 of the first reversing valve 22. The first reversing valve 22 is positioned to allow the second portion of the working fluid to flow through the first outlet 204. From the first outlet 204 of the first reversing valve 22, the second portion of the working fluid flows into the inlet 186 of the first heat exchanger 14, through the coil 185 of the first heat exchanger 14 (where the second portion of the working fluid absorbs heat from the outdoor ambient air outside of the building 188) and exits the first heat exchanger 14 through the outlet 187.

From the outlet 187 of the first heat exchanger 14, the second portion working fluid flows into the first inlet 210 of the second reversing valve 24. The second reversing valve 24 is positioned to allow the second portion of the working fluid to flow from the first inlet 210 of the second reversing valve 24 to the second outlet 216 of the second reversing valve 24. After exiting the second reversing valve 24 through the second outlet 216, the second portion of the working fluid flows to the suction inlet 32 of the compressor 12. In some configurations, the second portion of the working fluid flows from the second outlet 216 to the accumulator 46 then to the suction inlet 32 of the compressor.

As described above, the direction of fluid flow through the first heat exchanger 14 is the same in both cooling modes and in both heating modes. That is, as shown in FIGS. 1-4, fluid flows into the first heat exchanger 14 through the inlet 186 and exits the first heat exchanger 14 through the outlet 187. Stated yet another way, the opening of the first heat exchanger 14 designated as the "inlet" of the first heat exchanger 14 is the same opening in both heating modes and both cooling modes, and the opening of the first heat exchanger 14 designated as the "outlet" of the first heat exchanger 14 is the same opening in both heating modes and both cooling modes. The same is true for the second heat exchanger 16—i.e., the direction of fluid flow through the second heat exchanger 16 is the same in both cooling modes and in both heating modes. That is, the opening of the second heat exchanger 16 designated as the "inlet" of the second heat exchanger 16 is the same opening in both heating modes and both cooling modes, and the opening of the second heat exchanger 16 designated as the "outlet" of the second heat exchanger 16 is the same opening in both heating modes and both cooling modes.

Having the fluid flow through the heat exchangers 14, 16 in the same directions in both heating modes and both cooling modes allows for optimized heat transfer in all modes. Having the direction of working fluid flow be counter (or opposite) the direction of the flow of air forced across the heat exchangers 14, 16 by their respective fans improves heat transfer. By having the working fluid flow in the same direction through the heat exchangers 14, 16 in both heating modes and both cooling modes, the direction of working fluid flow can be counter to the direction of airflow in all modes. This improved heat transfer between the air and working fluid improves the efficiency of the climate-control system 10.

Similarly, the direction of fluid flow through the thermal storage device 27 is the same in heating and cooling modes, and the same in charging and discharging modes. That is, as shown in FIGS. 1-4, fluid flows into the thermal storage device 27 through the inlet 234 and exits the thermal storage device 27 through the outlet 230. By having the working fluid flow in the same direction through the thermal storage device 27 in heating modes and cooling modes, and in charging and discharging modes, a single sensor 248 may determine the temperature of the working fluid after passing through the thermal storage device 27, as opposed to multiple sensors placed on opposite sides of the thermal storage device 27. For example, in the embodiment shown in FIGS. 1-4, operation of the first expansion valve 18 is only dependent on data measured by the sensor 248.

Figure 7A:
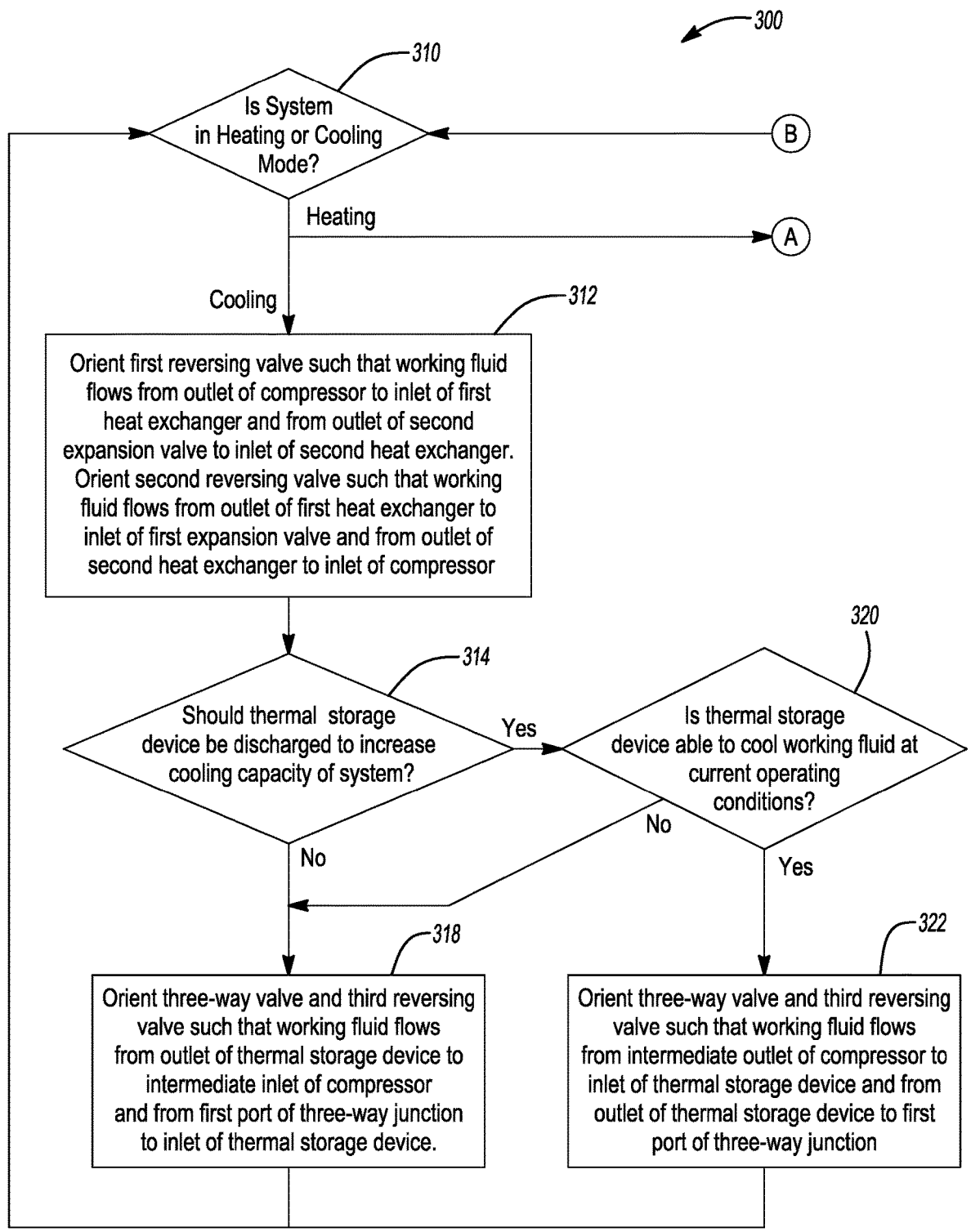
FIG. 7A is a first portion of a flowchart illustrating a method of controlling the system of FIGS. 1-4.
Figure 7B:
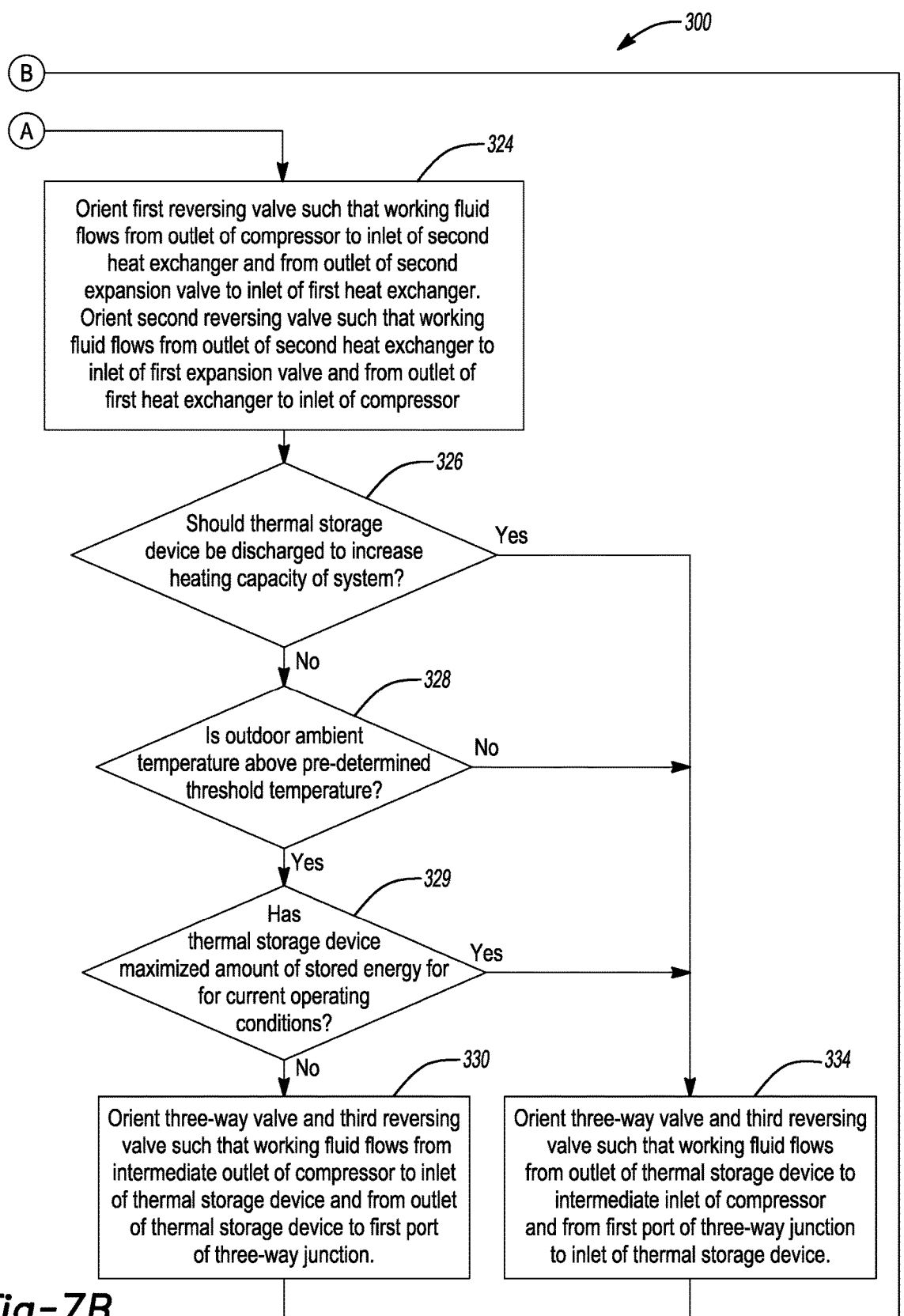
FIG. 7B is a second portion of the flowchart illustrating the method of controlling the system of FIGS. 1-4.

FIGS. 7A-7B illustrates a process 300 by which the control module 181 can control charging and discharging of the thermal storage device 27. At step 310, the control module 181 may receive information about whether the climate-control system 10 is in a heating or a cooling mode. This selection may be done by a user of the climate-control system 10, or the climate-control system 10 may be configured to make this selection based on outdoor weather conditions. If the control module 181 is configured in a cooling mode at step 310, the control module 181 directs (at step 312) the first reversing valve 22 to be oriented such that the working fluid flows from the discharge outlet 34 of the compressor 12 to the inlet 186 of the first heat exchanger 14 and from the outlet 208 of the second expansion valve 20 to the inlet 194 of second heat exchanger 16. At step 312, the control module 181 also directs the second reversing valve 24 to be oriented such that the working fluid flows from the outlet 187 of the first heat exchanger 14 to the inlet 218 of the first expansion valve 18 and from the outlet 196 of the second heat exchanger 16 to the suction inlet 32 of the compressor 12.

At step 314, the control module 181 may determine whether the thermal storage device 27 should be discharged to increase the cooling capacity of the climate-control system 10 (e.g., whether demand for cooling exceeds available cooling capacity of the climate-control system 10 when in the charging mode, whether site generated electric power is available, or whether the time-of-use cost of electricity is anticipated to rise in the following hours).

If the control module 181 determines at step 314 that the thermal storage device 27 should not be discharged to increase cooling capacity of the climate-control system 10, the control module 181 may (at step 318) place the climate-control system 10 in a charging mode by directing the three-way valve 179 to enter a configuration in which the first port 182 is bypassed and by directing the third reversing valve 180 to be oriented such that the working fluid may flow from the outlet 230 of the thermal storage device 27 to the intermediate inlet port 38 of the compressor 12 and from the first port 232 of the three-way junction 26 to the inlet 234 of the thermal storage device 27. In this configuration, the working fluid may cool the phase-change material 236, which can cool the working fluid at another time.

If the control module 181 determines at step 314 that the thermal storage device 27 should be discharged to increase cooling capacity of the climate-control system 10, the control module 181 may determine (at step 320) whether the thermal storage device 27 is able to cool the working fluid at the current operating conditions (e.g., whether the phase-change material 236 is at a sufficient temperature for cooling the working fluid or whether the phase-change material 236 is in a solid state). If the control module 181 determines at step 320 that the thermal storage device 27 is able to cool the working fluid at the current operating conditions, the control module 181 may (at step 322) place the climate-control system 10 in a discharging mode by directing the three-way valve 179 to enter a configuration in which the second port 183 is bypassed and by directing the third reversing valve 180 to be oriented such that the working fluid may flow from the from the intermediate outlet port 36 of the compressor 12 to the inlet 234 of the thermal storage device 27 and from the outlet 230 of the thermal storage device 27 to the first port 232 of the three-way junction. In this configuration, the working fluid may be cooled by the phase-change material 236.

If the control module 181 determines at step 320 that the thermal storage device 27 is not able to cool the working fluid at the current operating conditions, the control module 181 may (at step 318) place the climate-control system 10 in a charging mode by directing the three-way valve 179 to enter a configuration in which the first port 182 is bypassed and by directing the third reversing valve 180 to be oriented such that the working fluid may flow from the outlet 230 of the thermal storage device 27 to the intermediate inlet port 38 of the compressor 12 and from the first port 232 of the three-way junction 26 to the inlet 234 of the thermal storage device 27. When the climate-control system 10 is placed in the charging mode of step 318 due to the thermal storage device 27 not being able to cool the working fluid at the current operating conditions, the control module 181 may direct the first expansion valve 18 to lower the temperature and pressure of the working fluid such that cooling of the phase-change material 236 by the working fluid is minimized.

If the control module 181 is configured in a heating mode at step 310, the control module 181 directs (at step 324) the first reversing valve 22 to be oriented such that the working fluid flows from the discharge outlet 34 of the compressor 12 to the inlet 194 of second heat exchanger 16 and from the outlet 208 of the second expansion valve 20 to the inlet 186 of the first heat exchanger 14. At step 324, the control module 181 also directs the second reversing valve 24 to be oriented such that the working fluid flows from the outlet 187 of the first heat exchanger 14 to the suction inlet 32 of the compressor 12 and from the outlet 196 of the second heat exchanger 16 to the inlet 218 of the first expansion valve 18.

At step 326, the control module determines whether the thermal storage device 27 should be discharged to increase the heating capacity of the climate-control system 10 (e.g., whether demand for heating exceeds available heating capacity of the climate-control system 10 when in the charging mode, whether site generated electric power is available, or whether the time-of-use cost of electricity is anticipated to rise in the following hours).

If the control module 181 determines at step 326 that the thermal storage device 27 should not be discharged to increase heating capacity of the climate-control system 10, the control module 181 determines (at step 328) whether the outdoor ambient temperature is above a pre-determined threshold temperature. The pre-determined threshold temperature is determined by the volume ratio between the suction inlet 32 and the intermediate outlet port 36. At temperatures below the pre-determined temperature threshold, the working fluid exiting the compressor 12 through the intermediate outlet port 36 may be incapable of changing the temperature of the thermal storage device 27 to the desired thermal storage device temperature. In other words, the low outdoor ambient temperature may prevent the phase-change material 236 of the thermal storage device 27 from properly charging while in a heating and charging mode.

If the control module 181 determines the outdoor ambient temperature is above the pre-determined threshold temperature at step 328, the control module 181 determines (at step 329) whether the thermal storage device 27 has maximized an amount of stored energy for current operating conditions (e.g., whether the phase-change material 236 has risen to a maximum temperature for the current operating conditions or whether the phase-change material 236 is in the solid state). If the control module 181 determines at step 329 that the thermal storage device 27 has not maximized the amount of stored energy for current operating conditions, the control module 181 may (at step 330) place the climate-control system 10 in a charging mode by directing the three-way valve 179 to enter a configuration in which the second port 183 is bypassed and by directing the third reversing valve 180 to be oriented such that the working fluid may flow from the from the intermediate outlet port 36 of the compressor 12 to the inlet 234 of the thermal storage device 27 and from the outlet 230 of the thermal storage device 27 to the first port 232 of the three-way junction. In this configuration, the working fluid will heat the phase-change material 236, which can heat the working fluid at another time.

If the control module 181 determines at step 329 that the thermal storage device 27 has maximized the amount of stored energy for current operating conditions, the control module 181 may (at step 334) place the climate-control system 10 in a discharging mode by directing the three-way valve 179 to enter a configuration in which the first port 182 is bypassed and by directing the third reversing valve 180 to be oriented such that the working fluid may flow from the outlet 230 of the thermal storage device 27 to the intermediate inlet port 38 of the compressor 12 and from the first port 232 of the three-way junction 26 to the inlet 234 of the thermal storage device 27. When the climate-control system 10 is placed in the discharging mode of step 334 due to a maximum amount of energy being stored in the thermal storage device 27, the control module 181 may direct the first expansion valve 18 to lower the temperature and pressure of the working fluid such that the phase-change material 236 discharges minimal heat to the working fluid.

Similarly, if the control module 181 determines the outdoor ambient temperature is below the pre-determined threshold temperature at step 328, the control module 181 may (at step 334) place the climate-control system 10 in a discharging mode by directing the three-way valve 179 to enter a configuration in which the first port 182 is bypassed and by directing the third reversing valve 180 to be oriented such that the working fluid may flow from the outlet 230 of the thermal storage device 27 to the intermediate inlet port 38 of the compressor 12 and from the first port 232 of the three-way junction 26 to the inlet 234 of the thermal storage device 27. When the climate-control system 10 is placed in the discharging mode of step 334 due to a low outdoor ambient temperature, the control module 181 may direct the first expansion valve 18 to lower the temperature and pressure of the working fluid such that the phase-change material 236 discharges minimal heat to the working fluid.

If the control module 181 determines at step 326 that the thermal storage device 27 should be discharged to increase heating capacity of the climate-control system 10, the control module 181 may (at step 334) place the climate-control system 10 in a discharging mode by directing the three-way valve 179 to enter a configuration in which the first port 182 is bypassed and by directing the third reversing valve 180 to be oriented such that the working fluid may flow from the outlet 230 of the thermal storage device 27 to the intermediate inlet port 38 of the compressor 12 and from the first port 232 of the three-way junction 26 to the inlet 234 of the thermal storage device 27. In this configuration, the working fluid will be heated by the phase-change material 236.

At any of steps 318, 322, 330, 334, the control module 181 may adjust the first and second expansion valves 18, 20 to control the flow of working fluid through the second heat exchanger 16 to maintain efficient operation of the climate-control system 10. For example, the control module 181 may control the first and second expansion valves 18, 20 to maintain predetermined superheat values at the outlet 196 of the second heat exchanger 16. This would maintain a balance of airflow across the second heat exchanger 16 to working fluid flowing through the second heat exchanger 16 to maintain effective and efficient operation of the climate-control system 10. The control module 181 could employ on/off, proportional, proportional and integral, PID (proportional-integral-derivative), or fuzzy logic to control the first and second expansion valves 18, 20.

After any of steps 318, 322, 330, 334, the process 300 may loop back to step 310 and the process 300 may repeat continuously or intermittently.

It should be understood that in further embodiments of the present invention, the climate-control system may feature only one or two reversing valves. In these cases, the flow of the working fluid may be in either direction through any of the thermal storage device, the first heat exchanger, or the second heat exchanger to account for the fewer reversing valves. Otherwise, the structure and function of the climate-control system may be similar or identical to that of the climate-control system 10 described above.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), a controller area network (CAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A climate-control system comprising:
a compressor configured to compress a working fluid, the compressor comprising a suction inlet, an intermediate-pressure inlet, an intermediate-pressure outlet, a discharge outlet, and a plurality of compression pockets, wherein the plurality of compression pockets includes a suction-pressure pocket, a first intermediate-pressure pocket, a second intermediate-pressure pocket, and a discharge-pressure pocket;
a thermal storage device including a conduit in fluid communication with the compressor, the thermal storage device containing a phase-change material surrounding the conduit;
an outdoor heat exchanger in fluid communication with the compressor;
an indoor heat exchanger in fluid communication with the compressor;
a first expansion valve in fluid communication with the indoor heat exchanger and the outdoor heat exchanger; and
a second expansion valve in fluid communication with the indoor heat exchanger and the outdoor heat exchanger,
wherein the intermediate-pressure outlet of the compressor receives working fluid from the first intermediate-pressure pocket of the compressor,
wherein the intermediate-pressure inlet of the compressor provides working fluid to the second intermediate-pressure pocket of the compressor,
wherein working fluid in the discharge-pressure pocket is at a higher pressure than working fluid in the first intermediate-pressure pocket, wherein working fluid in the first intermediate-pressure pocket is at a higher pressure than working fluid in the second intermediate-pressure pocket, wherein working fluid in the second intermediate-pressure pocket is at a higher pressure than working fluid in the suction-pressure pocket,
wherein when the climate-control system is operating in a charging mode, the climate-control system is operable in a heating mode and in a cooling mode,
wherein when the climate-control system is operating in the charging mode and the heating mode, the phase-change material absorbs heat from the working fluid as the working fluid flows through the conduit of the thermal storage device, and
wherein when the climate-control system is operating in the charging mode and the cooling mode, the phase-change material transfers heat to the working fluid as the working fluid flows through the conduit of the thermal storage device.

2. The climate-control system of claim 1, wherein when the climate-control system is operating in the charging mode and the heating mode, the climate-control system is configured such that the working fluid flows from the compressor, through the indoor heat exchanger, through the outdoor heat exchanger, and to the compressor.

3. The climate-control system of claim 2, further comprising:
a first reversing valve in fluid communication with the compressor, including first and second inlets and first and second outlets; and
a second reversing valve in fluid communication with the compressor, including first and second inlets and first and second outlets,
wherein the first reversing valve is configured to allow working fluid to flow from the second expansion valve, through the first inlet of the first reversing valve and the first outlet of the first reversing valve, and to the outdoor heat exchanger, and to allow the working fluid to flow from the discharge outlet of the compressor through the second inlet of the first reversing valve and the second outlet of the first reversing valve, and to the indoor heat exchanger, and
wherein the second reversing valve is configured to allow the working fluid to flow from the outdoor heat exchanger, through the first inlet of the second reversing valve and the first outlet of the second reversing valve, and to the suction inlet of the compressor, and to allow the working fluid to flow from the indoor heat exchanger, through the second inlet of the second reversing valve and the second outlet of the second reversing valve, and to the first expansion valve.

4. The climate-control system of claim 3, further comprising a third reversing valve in fluid communication with the compressor, including first and second inlets and first and second outlets,
wherein the third reversing valve is configured to allow the working fluid to flow from the thermal storage device, through the first inlet of the third reversing valve and the first outlet of the third reversing valve, and to the second expansion valve, and to allow the working fluid to flow from the intermediate outlet of the compressor, through the second inlet of the third reversing valve and the second outlet of the third reversing valve, and to the thermal storage device.

5. The climate-control system of claim 1, wherein when the climate-control system is operating in the charging mode and the cooling mode, the climate-control system is configured such that the working fluid flows from the compressor, through the outdoor heat exchanger, through the indoor heat exchanger, and to the compressor.

6. The climate-control system of claim 5, further comprising:
a first reversing valve in fluid communication with the compressor, including first and second inlets and first and second outlets; and
a second reversing valve in fluid communication with the compressor, including first and second inlets and first and second outlets,
wherein the first reversing valve is configured to allow the working fluid to flow from the second expansion valve, through the first inlet of the first reversing valve and the first outlet of the first reversing valve, and to the indoor heat exchanger and to allow the working fluid to flow from the discharge outlet of the compressor, through the second inlet of the first reversing valve and the second outlet of the first reversing valve, and to the outdoor heat exchanger, and
wherein the second reversing valve is configured to allow the working fluid to flow from the outdoor heat exchanger, through the first inlet of the second reversing valve and the first outlet of the second reversing valve, and to the first expansion valve, and to allow the working fluid to flow from the indoor heat exchanger, through the second inlet of the second reversing valve and the second outlet of the second reversing valve, and to the suction inlet of the compressor.

7. The climate-control system of claim 6, further comprising a third reversing valve in fluid communication with the compressor, including first and second inlets and first and second outlets,
wherein the third reversing valve is configured to allow the working fluid to flow from the thermal storage device, through the first inlet of the third reversing valve and the first outlet of the third reversing valve, and to the intermediate inlet of the compressor, and to allow the working fluid to flow from the first expansion valve, through the second inlet of the third reversing valve and the second outlet of the third reversing valve, and to the thermal storage device.

8. The climate-control system of claim 1, wherein the climate-control system is configured such that the working fluid flows in a direction through the conduit of the thermal storage device when the climate-control system is operating in the heating mode and when the climate-control system is operating in the cooling mode.

9. The climate-control system of claim 1, wherein the phase-change material of the thermal storage device is paraffin.

10. The climate-control system of claim 1, wherein the phase-change material of the thermal storage device is salt hydrate.

11. A climate-control system comprising:
 a compressor configured to compress a working fluid, the compressor comprising a suction inlet, an intermediate-pressure inlet, an intermediate-pressure outlet, a discharge outlet, and a plurality of compression pockets, wherein the plurality of compression pockets includes a suction-pressure pocket, a first intermediate-pressure pocket, a second intermediate-pressure pocket, and a discharge-pressure pocket;
 a thermal storage device including a conduit in fluid communication with the compressor, the thermal storage device containing a phase-change material surrounding the conduit;
 an outdoor heat exchanger in fluid communication with the compressor;
 an indoor heat exchanger in fluid communication with the compressor;
 a first expansion valve in fluid communication with the indoor heat exchanger and the outdoor heat exchanger; and
 a second expansion valve in fluid communication with the indoor heat exchanger and the outdoor heat exchanger;
 wherein the intermediate-pressure outlet of the compressor receives working fluid from the first intermediate-pressure pocket of the compressor,
 wherein the intermediate-pressure inlet of the compressor provides working fluid to the second intermediate-pressure pocket of the compressor,
 wherein working fluid in the discharge-pressure pocket is at a higher pressure than working fluid in the first intermediate-pressure pocket, wherein working fluid in the first intermediate-pressure pocket is at a higher pressure than working fluid in the second intermediate-pressure pocket, wherein working fluid in the second intermediate-pressure pocket is at a higher pressure than working fluid in the suction-pressure pocket,
 wherein when the climate-control system is operating in a discharging mode, the climate-control system is operable in a heating mode and a cooling mode,
 wherein when the climate-control system is operating in the discharging mode and the heating mode, the working fluid absorbs heat from the phase-change material as the working fluid flows through the conduit of the thermal storage device, and
 wherein when the climate-control system is operating in the discharging mode and the cooling mode, the phase-change material transfers heat to the working fluid as the working fluid flows through the conduit of the thermal storage device.

12. The climate-control system of claim 11, wherein when the climate-control system is operating in the discharging mode and the cooling mode, the climate-control system is configured such that the working fluid flows from the compressor, through the outdoor heat exchanger, through the indoor heat exchanger, and to the compressor.

13. The climate-control system of claim 12, further comprising:
 a first reversing valve in fluid communication with the compressor, including first and second inlets and first and second outlets; and
 a second reversing valve in fluid communication with the compressor, including first and second inlets and first and second outlets,
 wherein the first reversing valve is configured to allow the working fluid to flow from the discharge outlet of the compressor, through the first inlet of the first reversing valve and the first outlet of the first reversing valve, and to the outdoor heat exchanger, and to allow the working fluid to flow from the second expansion valve, through the second inlet of the first reversing valve and the second outlet of the first reversing valve, and to the indoor heat exchanger, and
 wherein the second reversing valve is configured to allow the working fluid to flow from the outdoor heat exchanger, through the first inlet of the second reversing valve and the first outlet of the second reversing valve, and to first expansion valve, and to allow the working fluid to flow from the indoor heat exchanger, through the second inlet of the second reversing valve and the second outlet of the second reversing valve, and to the suction inlet of the compressor.

14. The climate-control system of claim 13, further comprising a third reversing valve in fluid communication with the compressor, including first and second inlets and first and second outlets,
 wherein the third reversing valve is configured to allow the working fluid to flow from the thermal storage device, through the first inlet of the third reversing valve and the first outlet of the third reversing valve, and to the second expansion valve, and to allow the working fluid to flow from the intermediate outlet of the compressor, through the second inlet of the third reversing valve and the second outlet of the third reversing valve, and to the thermal storage device.

15. The climate-control system of claim 11, wherein when the climate-control system is operating in the discharging mode and the heating mode, the climate-control system is configured such that the working fluid flows from the compressor, through the indoor heat exchanger, through the outdoor heat exchanger, and to the compressor.

16. The climate-control system of claim 15, further comprising:
 a first reversing valve in fluid communication with the compressor, including first and second inlets and first and second outlets; and
 a second reversing valve in fluid communication the compressor, including first and second inlets and first and second outlets,
 wherein the first reversing valve is configured to allow the working fluid to flow from the second expansion valve, through the first inlet of the first reversing valve and the first outlet of the first reversing valve, and to the outdoor heat exchanger and to allow the working fluid to flow from the discharge outlet of the compressor, through the second inlet of the first reversing valve and the second outlet of the first reversing valve, and to the indoor heat exchanger, and wherein the second reversing valve is configured to allow the working fluid to flow from the indoor heat exchanger, through the first inlet of the second reversing valve and the first outlet of the second reversing valve, and to the outdoor heat exchanger and to allow the working fluid to flow from the outdoor heat exchanger, through the second inlet of the second reversing valve and the second outlet of the second reversing valve, and to the suction inlet of the compressor.

17. The climate-control system of claim 16, further comprising a third reversing valve in fluid communication with the compressor, including first and second inlets and first and second outlets, wherein the third reversing valve is configured to allow the working fluid to flow from the first expansion valve, through the first inlet of the third reversing valve and the first outlet of the third reversing valve, and to thermal storage device and to allow the working fluid to flow from the thermal storage device, through the second inlet of the third reversing valve and the second outlet of the third reversing valve, and to the intermediate inlet of the compressor.

18. The climate-control system of claim 11, wherein the climate-control system is configured such that the working fluid flows in a direction through the conduit of the thermal storage device when the climate-control system is operating in the heating mode and when the climate-control system is operating in the cooling mode.

19. The climate-control system of claim 11, wherein the phase-change material of the thermal storage device is paraffin.

20. The climate-control system of claim 11, wherein the phase-change material of the thermal storage device is salt hydrate.

\* \* \* \* \*